United States Patent
Barker et al.

(10) Patent No.: US 10,957,902 B2
(45) Date of Patent: Mar. 23, 2021

(54) X/HARD CARBON COMPOSITE MATERIAL AND METHOD OF PREPARING THE X/HARD CARBON COMPOSITE MATERIAL

(71) Applicant: FARADION LIMITED, Sheffield (GB)

(72) Inventors: Jeremy Barker, Chipping Norton (GB); Yang Liu, Sheffield (GB)

(73) Assignee: FARADION LIMITED, Sheffield (GB)

( * ) Notice: Subject to any disclaimer, the term of this patent is extended or adjusted under 35 U.S.C. 154(b) by 165 days.

(21) Appl. No.: 15/765,874

(22) PCT Filed: Oct. 6, 2016

(86) PCT No.: PCT/GB2016/053122
§ 371 (c)(1),
(2) Date: Apr. 4, 2018

(87) PCT Pub. No.: WO2017/060718
PCT Pub. Date: Apr. 13, 2017

(65) Prior Publication Data
US 2018/0301696 A1    Oct. 18, 2018

(30) Foreign Application Priority Data
Oct. 6, 2015  (GB) ..................................... 1517661

(51) Int. Cl.
| | |
|---|---|
| H01M 4/36 | (2006.01) |
| H01M 4/38 | (2006.01) |
| H01M 4/58 | (2010.01) |
| H01M 10/05 | (2010.01) |
| H01M 4/587 | (2010.01) |
| H01M 10/054 | (2010.01) |
| B01J 13/04 | (2006.01) |
| H01M 4/13 | (2010.01) |
| H01M 10/0525 | (2010.01) |
| C01B 32/05 | (2017.01) |
| H01M 4/02 | (2006.01) |

(52) U.S. Cl.
CPC ............ *H01M 4/366* (2013.01); *B01J 13/04* (2013.01); *H01M 4/362* (2013.01); *H01M 4/387* (2013.01); *H01M 4/587* (2013.01); *H01M 10/054* (2013.01); *C01B 32/05* (2017.08); *C01P 2002/52* (2013.01); *C01P 2002/54* (2013.01); *C01P 2002/72* (2013.01); *C01P 2006/40* (2013.01); *H01M 4/13* (2013.01); *H01M 10/0525* (2013.01); *H01M 2004/021* (2013.01); *H01M 2004/027* (2013.01)

(58) Field of Classification Search
None
See application file for complete search history.

(56) References Cited

U.S. PATENT DOCUMENTS

| | | | |
|---|---|---|---|
| 2003/0138698 A1* | 7/2003 | Lee | C04B 35/6268 429/231.8 |
| 2012/0040249 A1* | 2/2012 | Sheem | H01M 4/134 429/231.8 |

FOREIGN PATENT DOCUMENTS

| | | |
|---|---|---|
| JP | 2014512635 A | 5/2014 |
| WO | 2013/106782 A2 | 7/2013 |

OTHER PUBLICATIONS

Combined Search and Examination Report under Sections 17 and 18(3), issued by the United Kingdom Intellectual Property Office, dated Apr. 21, 2016, from Application No. GB1517661.3, 7 pages.
International Search Report and Written Opinion dated Dec. 13, 2016, from International Application No. PCT/GB2016/053122, 14 pages.
International Preliminary Report on Patentability dated Sep. 6, 2017, from International Application No. PCT/GB2016/053122, 17 pages.
Wang, K. et al. "Preparation of Sn2Sb alloy encapsulated carbon microsphere anode materials for Li-ion batteries by carbothermal reduction of the oxides", ScienceDirect, Electrochimica Acta 52 (2006) 1221-1225.
Guo, B. et al. "Nano-Sn/hard carbon composite anode material with high-initial coulombic efficiency", ScienceDirect, Journal of Power Sources 177 (2008) 205-210.
Hasegawa, G. et al. "High-Level Doping of Nitrogen, Phosphorus, and Sulfur into Activated Carbon Monoliths and Their Electrochemical Capacitances", Chemistry of Materials 2015, 27, 4703-4712, XP-002764814.
English Translation of CN Office Action issued in CN 201680059173.8, dated Jun. 19, 2020.
Office Action relating to Japanese Application No. JP2018-516060, dated Oct. 5, 2020.

* cited by examiner

*Primary Examiner* — Jonathan Crepeau
*Assistant Examiner* — Angela J Martin
(74) *Attorney, Agent, or Firm* — Meunier Carlin & Curfman LLC

(57) ABSTRACT

The invention relates to novel material comprising X/hard carbon composite and to a process for their preparation, the process comprising the steps: a) forming a mixture comprising i) one or more hard carbon-starting materials, ii) one or more starting materials which comprise one or more of the component elements of X, and optionally iii) one or more secondary carbon-containing materials; and b) heating the resulting mixture at 100° C. to 1500° C. to yield the material comprising the X/hard carbon composite; wherein X comprises one or more component elements selected from antimony, tin, phosphorus, sulfur, boron, aluminium, gallium, indium, germanium, lead, arsenic, bismuth, titanium, molybdenum, selenium, tellurium, cobalt and nickel and wherein X is present in an amount of at least 5% by weight of the material comprising the X/hard carbon composite.

18 Claims, 18 Drawing Sheets

X/HARD CARBON COMPOSITE MATERIAL AND METHOD OF PREPARING THE X/HARD CARBON COMPOSITE MATERIAL

FIELD OF THE INVENTION

The present invention relates to hard carbon composite-containing materials, to a novel process for making materials comprising hard carbon composite, particularly particulate hard carbon composite, to anode electrodes containing such hard carbon composite-containing materials, and to the use of such anode electrodes in, for example, energy storage devices such as batteries rechargeable batteries, electrochemical devices and electrochromic devices.

BACKGROUND OF THE INVENTION

Sodium-ion batteries are analogous in many ways to the lithium-ion batteries that are in common use today; they are both reusable secondary batteries that comprise an anode (negative electrode), a cathode (positive electrode) and an electrolyte material, both are capable of storing energy, and they both charge and discharge via a similar reaction mechanism. When a sodium-ion (or lithium-ion battery) is charging, $Na^+$ (or $Li^+$) ions de-intercalate from the cathode and insert into the anode. Meanwhile charge balancing electrons pass from the cathode through the external circuit containing the charger and into the anode of the battery. During discharge the same process occurs but in the opposite direction.

Lithium-ion battery technology has enjoyed a lot of attention in recent years and provides the preferred portable battery for most electronic devices in use today; however lithium is not a cheap metal to source and is considered too expensive for use in large scale applications. By contrast sodium-ion battery technology is still in its relative infancy but is seen as advantageous; sodium is much more abundant than lithium and some researchers predict this will provide a cheaper and more durable way to store energy into the future, particularly for large scale applications such as storing energy on the electrical grid. Nevertheless a lot of work has yet to be done before sodium-ion batteries are a commercial reality.

One area that needs more attention is the development of suitable anode materials, particularly for sodium-ion batteries.

Carbon, in the form of graphite, has been favoured for some time as an anode material in lithium-ion batteries due to its high gravimetric and volumetric capacity; graphite electrodes deliver reversible capacity of more than 360 mAh/g, comparable to the theoretical capacity of 372 mAh/g. The electrochemical reduction process involves $Li^+$ ions being inserted into the van der Waals gap between the graphene layers, to yield $LiC_6$. Unfortunately however, graphite is much less electrochemically active towards sodium and this, coupled with the fact that sodium has a significantly larger atomic radius compared with lithium, results in the intercalation between graphene layers in graphite anodes being severely restricted in sodium-ion cells.

Anodes made using hard carbon materials with disordered structures on the other hand, are known to overcome some of the insertion issues for sodium ions. The exact structure of hard carbon materials has still to be resolved, but in general terms hard carbon is described as a non-graphitizable, non-crystalline carbon material. Hard carbon has layers, but these are not neatly stacked, and it has micropores (micro-sized pores) formed between the disorderly stacked carbon layers. At the macroscopic level, hard carbon is isotropic. One of the reasons why it is difficult to construct a universal structural model of hard carbon is that detailed structures, domain size, fraction of carbon layers and micropores depend on the synthesis conditions, such as carbon sources and carbonization temperatures. Typical methods of hard carbon production employ starting materials such as sucrose, glucose, petroleum coke or pitch coke, which are mixed with a thermoplastic binder such as coal tar, petroleum based pitch or a synthetic resin, and then heated up to about 1200° C. However, despite being better than graphite, such hard carbon materials only provide a usable capacity in sodium-ion batteries below 300 mAh/g and suffer from slow insertion kinetics and low volumetric energy density.

As discussed in J Mater. Chem. A, 2015, 3, 5708, over the last few years, Na-storable metals and alloys have been identified as high-capacity anodes, including Sn (847 mAh/g, $Na_{15}Sn_4$), Sb (660 mAh/g, $Na_3Sb$), Ge (1108 mAh/g, $Na_3Ge$) and Pb (484 mAh/g, $Na_{15}Pb_4$). However, the structural stability of these materials suffer from severe changes in expansion and contraction when Na is inserted and extracted during the charge/discharge process. For example, the change in volume is 525% for Sn and 390% for Sb, and the continual expansion and contraction causes the metals to fatigue, and undergo a pulverization process.

Attempts to address this problem have included i) reducing the metal particle size to nanoscale (<10 nm) in order to mitigate the strain induced by the large volume changes, and to retard pulverization; and ii) uniformly dispersing nanosized materials within conductive matrices to accommodate the volume changes and maintain the mechanical integrity of the composite electrode. For example, in Chem. Commun., 2012, 48, 3321, Xiao et al report that a Sb/Sn/C nanocomposite material with a Na storage capacity of about 500 mAh/g and good cycling stability, can be prepared by combining the components of the composite material (Sb, Sn and C) using a high-energy mechanical milling (HEMM) process conducted under an argon atmosphere. The metal: carbon black (C65™ carbon) weight ratio was set to 7:3 and the Sn:Sb ratio was 1:1 by molar ratio. However, whilst such a technique allows the nano-particle size of the product to be controlled by varying the milling time and choice of milling media, the process is expected to be expensive to run on a large scale and likely only to be useful for making very small amounts of product, of the order of 5-10 g per batch. The use of larger quantities of materials is likely to cause serious abrasion to the milling equipment. Moreover, the HEMM method is known to generate a good degree of heat which will be sufficient to melt low melting metals such as tin, and this will cause handling difficulties. Therefore, the HEMM process is likely to be uneconomic for commercial anode material production.

Numerous workers have pursued other ways to provide nanosized materials that are uniformly dispersed within conductive matrices. For example, US2003/0138698 discloses making carbonaceous materials coated with a metal or metal oxide for a lithium secondary battery by a gas suspension spray coating process. Firstly, particles of carbon active material are made to float in a gas, then a solution of a metal salt is sprayed onto the floating carbon particles. The resulting coated particles are dried to coat the metal salt onto the surface of the particles and then heated to form a cluster or thin film of metal or metal oxide on the surface of the particles. Although reasonable percentage cycle life results are reported, it is believed that an anode particle coated with a very thin metallic film will not be very robust and is likely to suffer when the overall particle expands and contracts during charge and discharge. Moreover, the positive effect of such a thin metallic film on discharge capacity only looks to be minimal with the results for materials with the thin metal film being recorded as just over 300 mAh/g.

X. He et al disclose, in Electrochimica Acta 52 (2006) 1221-1225, the preparation of $Sn_2Sb$ alloy encapsulated within carbon microsphere anode materials for lithium-ion batteries by carbothermal reduction of oxides. In particular they disclose using an inverse emulsion polymerisation of resorcinol-formaldehyde in the presence of $Sb_2O_3$ and $SnO_2$ powders. Similarly, Scrosati and co-workers report in WO2010095082A1 that nanostructured Sn/C composite anode materials can be prepared by engulfing a Sn-based organometallic compound in a resorcinol-formaldehyde gel, followed by calcining the resultant material in an argon atmosphere to reduce the tin in the tin metallic precursor and to carbonize the gel. Further, Xu et al, in J. Mater. Chem 2012, 22, 9562, teach sponge-like porous carbon/Sn composite anodes made by dispersing $SnO_2$ nanoparticles in a soft template polymer followed by carbonisation. US2012/0040249 discloses providing a metallic material precursor (including at least one of Cu, Ni, Ag, Au and Pt) on the surface of a carbon material by mixing small amounts (1 wt % of the reaction mixture) of a metallic material precursor with a carbon material, coating the surface with a carbon precursor and heating the resulting mixture at 700° C. to 1500° C. for about 1 to about 8 hours to yield 1 nm to 100 nm sized particles of metal distributed over a carbon core with a further carbon film covering the carbon core particles and the metallic material. Reasonable percentage cycle life results are reported, but there is no indication in this document that the very low amounts of metal that are available to be deposited on carbon material will produce any positive effect to increase the discharge capacity compared against carbon material without a metal coating.

In J. Power Sources 284 (2015) 287-295, Shirley Meng et al. describe making $SnO_2$/hard carbon composite material starting from a reaction mixture containing $SnCl_4$, aqueous ammonia and glucose. However, although these processes may lend themselves better to commercial scaling, the formation of hard carbon in situ during a carbonisation process, means that it is difficult to control the nano-metal/hard carbon particle size, and to disperse the metal particles uniformly in the hard carbon matrix. Further, it has so far not been possible to prepare SnO/hard carbon nano-composite material as attempts to prepare such a material by Shirley Meng et al in the literature discussed above failed, due to the SnO being oxidized to $SnO_2$ during the decomposition of the carbon precursor.

Also recently, in J. Mater. Chem. A, 2015, 3, 5708-5713, Wu, Lu, Xiao et al. describe an aerosol spray drying technique to prepare Sb/C microspheres starting from a mixture containing polyacrylonitrile and $SbCl_3$ dissolved in dimethylformamide which is firstly vigorously stirred at 60° for 12 hours, before using this mixture for spray drying, followed by collecting the resulting particles, heating them at 280° C. for 6 hours to consolidate their spherical morphology, and then heating them again at 700° C. for 6 hours to obtain the Sb/C microspheres. Although the desired outcome of discrete microsperes with well-dispersed, ultra-small Sn particles within a carbon matrix appears to be achieved, this process is complicated and would be expensive to perform, especially on a commercial scale.

The aim of the present invention is to provide novel hard carbon composite materials for use as anode-active materials in alkali metal-ion energy storage systems, for example lithium-ion batteries and particularly for sodium-ion batteries. The aim is also to provide a new process for the preparation of such new hard carbon composite materials. The new hard carbon composite materials will deliver an excellent first discharge specific capacity and exhibit high first discharge capacity efficiency, the process for their preparation will be cost effective, especially on a commercial scale, and will use readily available starting materials that do not require complex handling conditions. The ability of the process to prepare hard carbon composite materials with elements with a low melting point such as tin, is especially important. Further advantageous aims of the present invention are to provide hard carbon composites in which i) the particle size of each constituent of the hard carbon composite is controlled, ii) each of the constituents is uniformly dispersed and iii) the amount of each constituent is predetermined. Ideally, the process of the present invention will be straightforward to carry out, preferably in a single step, it will be able to produce the desired composite in good yield, and finally, it will be able to produce hard carbon composite materials that are able to be used directly, i.e. without the need for separation or purification steps.

In a first embodiment, the present invention therefore provides a process for preparing a material comprising an X/hard carbon composite, the process comprising the steps:
a) forming a mixture comprising i) one or more hard carbon starting materials, ii) one or more starting materials which comprise one or more of the component elements of X, and optionally iii) one or more secondary carbon-containing materials; and
b) heating the resulting mixture at 100° C. to 1500° C. to yield the material comprising the X/hard carbon composite;

wherein X comprises one or more component elements selected from antimony, tin, phosphorus, sulfur, boron, aluminium, gallium, indium, germanium, lead, arsenic, bismuth, titanium, molybdenum, selenium, tellurium, cobalt and nickel;

and wherein X is present in an amount of at least 5% by weight of the material comprising the X/hard carbon composite.

Very preferably, the one or more component elements of X are selected from: P, S, In, Sb, Sn, Pb and Ge.

The material comprising the X/hard carbon composite made by the process of the present invention comprises particles of X dispersed on the surface of a hard carbon core. However, the Applicant has found particular advantage when at least some of the component elements of X are located in the micro-sized pores of the hard carbon material; it is believed that this structure in particular will compensate for the volume expansion of the component elements of X and will give better long-term electrochemistry.

The material comprising the X/hard carbon composite made by the process of the present invention are useful anode materials for either sodium- or lithium-ion cells, but their use as anode materials for sodium-ion cells is particularly preferred.

A preferred feature of the present invention is that the average oxidation state of the one or more component elements of X in the one or more starting materials which comprise one or more of the component elements of X, is reduced during the process of the present invention. Preferably the reduction occurs during the heating step of the process. Thus, the average oxidation state of the one or more component elements of X in the X/hard carbon composite, is lower than the average oxidation state of the one or more component elements of X in the one or more starting materials which comprise one or more of the component elements of X. This reduction may be achieved by the reaction process being conducted in a reducing atmosphere (e.g. comprising carbon monoxide or hydrogen). Alternatively, it is desirable that the process of the present invention proceeds via a carbothermal-type reduction reaction which is facilitated by the reaction conditions, e.g. a non-oxidising atmosphere (such as nitrogen or argon), and the presence of the one or more secondary carbon-containing materials facilitate and/or the hard carbon starting material.

During a carbothermal-type reduction, the one or more component elements of X in the starting materials which comprise one or more of the component elements of X, are nucleated onto the carbon surface of the hard carbon-containing starting material. The result is a favourable X/hard carbon composite which has an intimate and uniform dispersion of the component elements of X in or on the pores of the hard carbon. The conductivity of the X/hard carbon composite is improved as a result of a network of finely divided component elements of X, preferably being deposited onto the carbon surface. The creation of multiple nucleation sites through the use of finely divided hard carbon also has the beneficial effect of minimizing grain growth of the X on the X/hard carbon composite. Further advantageously, the one or more secondary carbon material, promotes a carbo-thermal reaction which produces an even greater multitude of potential nucleation sites, and these, in turn, further minimize the grain growth of the component elements of X in the X/hard carbon composite. This is particularly the case when temperature conditions suitable to control particle size are also employed. The nucleation of the component elements of X onto the carbon surface is not able to occur in the case of the mechanical mixing methods that are employed in some of the prior art where the composite is simply a physical mixture of the components.

Thus, the process of the present invention will involve either the full or partial reduction of one or all of the one or more component elements of X, in the one or more starting materials which comprise one or more of the component elements of X. Preferably in the process of the present invention, one or more of the component elements of X in the one or more starting materials which comprise one or more of the component elements of X is reduced to oxidation state zero, or substantially zero, during the process of the present invention, preferably during the heating step. Further preferably, all of the one or more of the component elements of X in the X/hard carbon composite are in oxidation state zero or substantially zero.

Preferably, the one or more component elements of X in the X/hard carbon composite will be derived from the one or more starting materials which comprise one or more of the component elements of X.

Additionally or alternatively one or more of the component elements of X, in the X/hard carbon composite, are in compound form, for example with one or more secondary elements, preferably selected from: oxygen, carbon, nitrogen, phosphorus, sulfur, silicon, fluorine, chlorine, bromine and iodine. Further additionally or alternatively, the X/hard carbon composite, may comprise an alloy of two or more of the component elements of X.

In preferred material comprising an X/hard carbon composite made by the process of the present invention, X comprises one or more component elements selected from P, S, Sn, SnO, $SnO_2$, Sb, $Sb_2O_3$, SnSb and SbO. Particularly preferred examples of materials comprising X/hard carbon composite made by the process of the present invention include: P/hard carbon, S/hard carbon, SnO/hard carbon, SnSnO/hard carbon, PSnO/hard carbon, SSnO/hard carbon, $SbSb_2O_3$/hard carbon, PSn/hard carbon, PSb/hard carbon and SnSb/hard carbon. In all cases X will be present in an amount of at least 5 wt % of the X/hard carbon composite.

In the process of the present invention the one or more starting materials which comprise one or more of the component elements of X are preferably in compound form, for example the starting materials can be oxides (e.g. $Sb_2O_3$, $SnO_2$), carbonates (e.g. $Sn_2CO_3$), nitrates (e.g. $Pb(NO_3)_2$), phosphates or phosphides (e.g. $Na_2HPO_2$, $H_3PO_4$, $AlPO_4$, InP), sulfates or sulfides (e.g. $CoSO_4$, $B_2S_3$,), silicates (e.g. $Sn(SiO_3)_2$), halides (e.g. $SnF_4$, $SbCl_3$, $BiBr_3$ and $GeI_4$). The use of such starting materials in compound form, is in contrast to the use of an elemental form of X as a starting material by some of the prior art processes, and overcomes the difficulties caused by the low melting point of metals such as elemental tin.

However, in an alternative aspect, one or more of the starting materials may comprise one or more of the component elements of X in elemental form; this is particularly the case when X comprises phosphorus, i.e. phosphorus in elemental form is preferably used. When the component element of X in elemental form is used it may be coated with a coating material which, for example, is designed to prevent sintering during the heating step (b) of the process of the present invention.

Another advantage of the present invention is that it is possible to control the particle size of the one or more starting materials which comprise one or more of the component elements of X by for example milling the starting materials; this further assists in the production of uniformly dispersed small particulate X/hard carbon composite.

The process of the present invention employs a starting material for the hard carbon component of the X/hard carbon composite; the "hard carbon starting material". Such a hard carbon starting material may be any suitable carbon-containing material which is able to be converted to a hard carbon-containing material either during the process of the present invention, for example during the heating step b), or during a separate carbonization step. Such a suitable carbon-containing material (hard carbon starting material) may include, for example, an organic polymer (e.g. polyacrylonitrile or resorcinol-formaldehyde gel), glucose, sucrose, cellulose etc. The process of the present invention may alternatively employ a hard carbon starting material which already comprises hard carbon, for example because it has been pre-made prior to mixing with the one or more starting materials which comprise one or more of the component elements of X. In other words, the present process can use a hard carbon which is not made in situ as part of the process of the present invention, and as a result, its production does not rely on the in situ carbonization of a hard carbon starting material, Such pre-made hard carbon starting materials are conveniently available from commercial sources such as the Carbotron® hard carbon material (Kureha Corporation), or the Bio-Carbotron™ hard carbon material (Kuraray Chemical Company and Kureha Corporation). Alternatively, a proprietary Faradion hard carbon starting material with particularly advantageous structural characteristics can be easily made in a separate reaction prior to the process of the present invention, starting from a source of carbon such as sucrose-containing, or preferably a carbohydrate-containing material such as corn starch.

The preferred method to produce the proprietary Faradion pre-made hard carbon starting materials involves firstly heating a carbon source (e.g. sucrose or carbohydrate-containing material) at 220-240° C. for about 24 hours to dry it. Then the sample is ground to a particle size of about 20-30 μm using ball milling apparatus, followed by heating it under an inert atmosphere at a heating rate of about 5° C./min up to about 1200-1500° C., with a suitable dwell time to effect pyrolysis. Usually, the dwell time is 2 hours. The resulting pyrolysed product is then recovered following cooling to room temperature, preferably at a rate of about 5° C./min.

Not only are the structural characteristics of a pre-made hard carbon starting material able to be controlled through the choice of carbon source and/or pyrolysis conditions, but its particle size can also be easily modified, for example by milling using suitable apparatus such as a planetary milling machine. Preferably, such pre-made hard carbon-containing starting materials can be milled to a particle size of 1 to 20 μm, preferably from 5 to 15 μm, ideally from 5 to 10 μm, and further ideally from 5 to less than 10 μm.

The first discharge specific capacity for hard carbon alone is generally under 200 mAh/g, but this value is too low to be of any real commercial value. The Applicant has advantageously found that materials comprising the X/carbon composite made by the present invention which contain at least 5 wt % of component X (as defined above) can significantly improve this first discharge specific capacity. Further, the Applicant has found that when the wt % amount of X in the composite is increased, further improvements in the first specific discharge capacity are also observed.

The first cycle efficiency is another useful measure of the commercial utility of an anode material. When hard carbon starting materials with a small particle size are used to provide the only source of hard carbon-containing in the anode material the first cycle efficiency is about 80-85%. However, the Applicant has surprisingly found that the materials comprising the X/hard carbon composite made by the process of the present invention show an efficiency over 90% when one or more secondary carbon-containing material is incorporated into the reaction mixture used in the process of the present invention. Preferred secondary carbon-containing materials include any carbon material with a BET nitrogen surface area of at least 5 m$^2$/g, preferably at least 15 m$^2$/g, advantageously at least 50 m$^2$/g, ideally at least 62 m$^2$/g and further ideally at least 500 m$^2$/g.

Suitable example secondary carbon-containing materials include: activated carbon materials, particulate carbon black materials, graphene, carbon nano-tubes and graphite. Example particulate carbon black materials include: "C65™ carbon (also known as Super P® carbon black) (BET nitrogen surface area 62 m$^2$/g) (available from Timcal Limited) although other carbon blacks are also available with a BET nitrogen surface area of <900 m$^2$/g, for example "Ensaco® 350 g" which is a carbon black with a BET nitrogen surface area of 770 m$^2$/g (available from Imerys Graphite and Carbon Limited as speciality carbons for rubber compositions). Carbon nano-tubes have a BET nitrogen surface area of 100-1000 m$^2$/g, graphene around 2630 m$^2$/g and activated carbon materials have a BET nitrogen surface area of >3000 m$^2$/g.

As described above, the process of the present invention preferably involves at least the partial reduction of one or all of the one or more component elements of X, using one or both of the hard carbon starting material and the one or more secondary carbon-containing materials in a carbothermal reduction reaction. Ideally, in the process of the present invention, the amount of the one or more secondary carbon materials is sufficient to ensure that a maximum amount of carbon monoxide is generated during the reaction process, based on the amounts of the starting materials used. That is, the amount of one or more secondary carbon-containing materials is calculated such that it will all be oxidised to CO during the reduction reaction. Thus in this example, the final product (the material comprising an X/Hard carbon composite) will not contain any secondary carbon-containing material. For example: the amount of C65™ carbon added to the one or more starting materials which contain one or more component elements of X, e.g. Sb$_2$O$_3$ and SnO$_2$, is determined according to the formulae below:

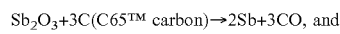
Sb$_2$O$_3$+3C(C65™ carbon)→2Sb+3CO, and

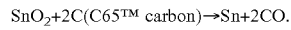
SnO$_2$+2C(C65™ carbon)→Sn+2CO.

The present invention also preferably employs one or more secondary carbon materials in the reaction mixture, in an excess amount (i.e. in an over stoichiometric amount for the carbothermal reduction reaction), this is to ensure that at least a portion of the one or more secondary carbon-containing materials is present in the final material, i.e. X/secondary carbon-containing material/Hard carbon composite product. Useful examples include X/Graphite/Hard Carbon composite (which is expected to be useful for Li-ion applications), or as an X/hard carbon/C65™ carbon composite, or an X/Ensaco® 350 g/hard carbon composite.

In this way it is possible to make a highly conductive X/hard carbon composite in-situ during the synthesis step (b) of the present invention, which will improve the subsequent electrode performance. Moreover, an excess of one or more secondary carbon materials, will aid the morphology of the composite product. The one or more secondary carbon-containing materials present in the X/one or more secondary carbon-containing materials/Hard carbon composite will helpfully improve the composite's conductivity; and graphite is particularly useful at this because it is more conductive than C65™ carbon.

Preferably, the one or more secondary carbon material is chosen to the same carbon material which would conventionally be used in a subsequent process of electrode formulation. This will ensure that the number of constituents in the anode is kept to a minimum and that costs are controlled.

In another aspect therefore, the present invention provides a process for preparing a material comprising a X/secondary carbon-containing material/hard carbon composite comprising the steps:

a) forming a mixture comprising i) one or more starting materials for a hard carbon material, ii) one or more starting materials comprising one or more of the component elements of X, and iii) an excess of one or more secondary carbon materials; and b) heating the resulting mixture to yield an X/secondary carbon/hard carbon composite; wherein X comprises one or more component elements selected from antimony, tin, phosphorus, sulfur, boron, aluminium, gallium, indium, germanium, lead, arsenic, bismuth, titanium, molybdenum, selenium, tellurium, cobalt and nickel; and wherein X is present in an amount of at least 5 wt % in the X/secondary carbon-containing material/hard carbon composite.

Preferably, the average oxidation state of the one or more component elements of X in the X/secondary carbon-containing material/hard carbon composite is lower than the average oxidation state of the one or more component elements of X in the one or more starting materials comprising one or more of the component elements of X.

The present invention therefore provides material comprising an X/hard carbon composite, comprising one or more hard carbon materials, one or more component elements of X and one of more secondary carbon-containing materials.

The one or more hard carbons, the one or more component elements of X and the one or more secondary carbon-containing materials are the same as those described above.

Advantageously, the use of a Sn-containing compound (such as $SnO_2$) as the starting material comprising the component elements of X, avoids the issue of dealing with the handling problems caused by tin metal having a melting point of 231.9° C.

Unlike some of the prior art processes described above, the process of the present invention may be easily adapted to produce commercial quantities of material comprising X/hard carbon composite (10-1000 kg/batch), at low cost and using a simple continuous production process. Moreover, the X/hard carbon composite-containing material is recoverable at the end of the process of the present invention without the need for purification prior to being used in anode production.

As discussed above, step a) in the process of the present invention involves forming a mixture comprising i) one or more hard carbon starting materials, ii) one or more starting materials which comprise one or more of the component elements of X, and optionally iii) one or more secondary carbon-containing materials. Mixing is conveniently achieved using a planetary mill and the starting materials i), ii) and optionally iii), can be mixed together in any order and in any combination. Preferably, the one or more hard carbon starting materials and the one or more starting materials which comprise one or more of the component elements of X are dry mixed in a planetary milling machine for at least 5 minutes, preferably for 5 minutes to 12 hours and typically for 30 minutes, at a speed of 100 rpm to 800 rpm, desirably at a speed of 250 to 350 rpm and typically at a speed of 300 rpm.

Two typical mixing regimes for step (a) of the process of the present invention are described as follows:
1) Starting materials: one or more hard carbon starting materials, one or more starting materials which comprise one or more of the component elements of X (e.g. $Sb_2O_3$ or $SnO_2$) and optionally one or more secondary carbon-containing materials.
   Mixing method: dry mixing all of the starting materials together in a single step using planetary mill for 30 mins at a speed of about 300 rpm.
2) Starting materials: one or more hard carbon starting materials, one or more starting materials which comprise one or more of the component elements of X (e.g. $Sb_2O_3$ or $SnO_2$) and one or more secondary carbon-containing materials
   Mixing method: the starting materials are dry mixed in a two-step process.
   Step i): one or more starting materials which comprise one or more of the component elements of X (e.g. $Sb_2O_3$ or $SnO_2$) and the one or more secondary carbon-containing materials are dry mixed using planetary mill for 4 hrs at a speed of about 300 rpm.
   Step ii): one or more hard carbon starting materials are then added to the mixture from step i) and dry mixed using a planetary mill for 30 mins at about 300 rpm.

Step (b) of the process of the present invention involves heating the mixture resulting from step (a), in either a non-oxidising or a reducing atmosphere to yield an X/hard carbon composite. The temperature and chosen atmosphere will facilitate at least a partial reduction of some or all of the one or more component elements of X in the X/hard carbon composite. The precise temperature used will differ depending on the particular choice of reactants, but it is important that the heating temperature is, on the one hand, high enough to ensure the at least partial reduction of the one or more of the component elements of X in the starting material, and on the other hand is not so high that it encourages the particle size of the components of X in the X/hard carbon composite to grow too large, because this causes problems as discussed below.

The heating temperature in heating step (b) is typically performed either at a single temperature or over a range of temperatures and is in the range 100 to 1500, preferably 100 to 850° C. preferably 100 to 700° C., yet further preferably 200 to 600° C., advantageously 200 to 695° C. and ideally 200 to 590° C. The typical temperature used tends towards 100 to 700° C., when one or more secondary carbon-containing materials are present in the reaction mixture. The duration of heating is for as long as is necessary for the one or more component elements of X to be at least partially reduced. Typically the heating step is performed for up to 10 hours, preferably up to 8 hours, further preferably up to 4 hours and ideally up to 2.5 hours.

It is highly desirable to use the minimum temperature and shortest dwell time when carrying out the process of the present invention because the particles of X will grow at high temperatures, and the higher the temperature used in heating step b) the quicker the particles of X will grow. Also, the grain size of X will increase as the dwell time increases. If the grain size of X is not controlled within the desired size limits then the resulting X/hard carbon composite is found to exhibit poor electrochemical behaviour when used as an anode material. Preferably, therefore the particles of X in the resulting X/hard carbon composite have a particle size, which can be determined by microscopy, of no larger than 20 μm, most preferably no larger than 15 μm, and ideally in the range 0.1 to 10 μm.

The particle size of the hard carbon in the x/hard carbon composite is typically 1 to 20 μm and preferably between 5 and 10 μm. The preferred size of the X/hard carbon composite particle is in the region of 10 μm.

The heating step (b) is readily conducted in a tube furnace. The most favourable temperature range for a particular one or more starting materials which comprise one or more of the component elements of X is conveniently determined by forming the starting material mixture as described above, heating it through a sequence of individual temperatures from low to high temperature and observing the effect that each temperature has on the starting material mixture, using XRD analysis. From these tests it is possible to determine at which temperature the starting materials (e.g. $Sb_2O_3$ or $SnO_2$) are fully reduced to the respective metals (e.g. Sb and Sn) or partially reduced to the respective compounds (e.g. $SbO_2$ and SnO).

A non-oxidizing atmosphere is conveniently provided by a static or flowing stream of a non-oxidising gas such as nitrogen or argon and a reducing atmosphere is conveniently provided by a static or flowing stream of a reducing gas such as hydrogen or carbon monoxide.

The general method of the present invention involves a step (a) during which i) the one or more hard carbon starting materials, ii) the one or more starting materials which comprise one or more of the component elements of X, and optionally iii) the one or more secondary carbon-containing materials, are mixed together, preferably using one of the planetary milling methods described above, and the resulting milled starting material mixture is then placed into any suitable reaction vessel, for example an alumina crucible.

The filled crucible is then put into a tube furnace, preferably under a non-oxidizing atmosphere, and the milled starting material mixture is heated per the heating step (b). Preferably the rate of heating is reasonably slow, for example 2 to 5° C./min, and once at the desired temperature there follows a dwell period of up to 6 hours, before the reaction mixture is cooled, for example at a rate of 5 to 10° C./minute, to form the resulting X/hard carbon composite.

The required ratio of the starting materials present in the reaction vessel prior to the heating step (b) (i.e. the one or more starting materials which comprise one or more of the component elements of X:one or more hard carbon starting materials:one or more secondary carbon-containing materials) will be determined by back calculating from the amount of reducing agent that will need to be produced to yield the desired product composition.

For example, when a 10 wt % Sb/hard carbon composite is desired, the starting materials will need to be present in the following amounts:

Secondary carbon material=1.4 wt %;
Starting material comprising one or more of the composite elements of X, $Sb_2O_3$=11.6 wt %
and
hard carbon starting material=87.0 wt %
Final ratios in the X/hard carbon composite: Sb=10 wt %, hard carbon=90 wt %

When a 30 wt % Sb/hard carbon composite is desired, the starting materials will need to be present in the following amounts:

Secondary carbon material=4.0 wt %;
Starting material comprising one or more of the composite elements of X, $Sb_2O_3$=32.5 wt %;
and hard carbon-containing starting material=63.5 wt %
Final ratios in the X/hard carbon composite: Sb=10 wt %, hard carbon=90 wt %

When a 10 wt % Sn/hard carbon composite is desired the starting materials will need to be present in the following amounts:

Secondary carbon=2.0 wt %;
Starting material comprising one or more of the composite elements of X, $SnO_2$=12.0 wt %;
and
hard carbon starting material=86.0 wt %
Final ratios in the X/hard carbon composite: Sn=10 wt %, hard carbon=90 wt %

When a 30 wt % Sn/hard carbon composite is desired the starting materials will need to be present in the following amounts:

Secondary carbon=5.3 wt %;
Starting material comprising one or more of the composite elements of X, $SnO_2$=33.5 wt %;
and
hard carbon starting material=61.2 wt %
Final ratios in the X/hard carbon composite: Sn=30 wt %, hard carbon=70 wt %

The amount of X in the X/hard carbon composite is at least 5% by weight of the X/hard carbon composite or the X/secondary carbon-containing material/hard carbon composite; preferably the amount of X is from 5% to 90% by weight, further preferably from 5% to less than 70% by weight, advantageously 8% to 65% by weight, and from 10% to 30% by weight is especially preferred.

The process of the present invention provides many advantages over the methods described in the prior art. Firstly, it is possible independently to control the particle size of the X/hard carbon composite and/or the grain size of X and/or the hard carbon in the X/hard carbon composite and the X:carbon ratio, by: i) milling the starting materials; ii) varying the heating temperature used in step (b) of the process, iii) altering the duration of the heating step (b), e.g. by altering the dwell time, and iv) by varying the additives used in the starting material mixture.

The process of the resent invention allows for benefit to be obtained as a result of the many different properties of the hard carbon and/or the one or more secondary carbon-containing materials, for example as a reductant, as a material which can absorb/adsorb sodium, as a dispersant for X, and as a material for maintaining X in a fixed location.

In a second embodiment, the present invention provides a material comprising a X/hard carbon composite wherein X comprises one or more selected from antimony, tin, phosphorus, sulfur, boron, aluminium, gallium, indium, germanium, lead, arsenic, bismuth, titanium, molybdenum, selenium, tellurium, cobalt and nickel, in elemental and/or compound form; wherein X is present in an amount of at least 5% of the X/hard carbon composite.

Preferably, the material according to the present invention comprises an X/hard carbon composite wherein X comprises one or more selected from Sb, Sn, P, S, In, Pb and Ge, in elemental and/or compound form; wherein X is present in an amount of at least 5% of the X/hard carbon composite.

Preferably, the elemental components of X are located on the outer surface of the hard carbon material, and/or within the micro-size pores in surface of the hard carbon material.

In the X/hard carbon composite it is preferred that when X comprises Sn or a SnSb alloy, particles of Sn or SnSb alloy are only located within the micro-size pores in the surface of the hard carbon material.

Further the present invention provides a material comprising a X/one or more secondary carbon-containing material/hard carbon composite-containing materials, wherein X comprises one or more selected from antimony, tin, phosphorus, sulfur, boron, aluminium, gallium, indium, germanium, lead, arsenic, bismuth, titanium, molybdenum, selenium, tellurium, cobalt and nickel, in elemental and/or compound form; wherein X is present in an amount of at least 5% of the X/one or more secondary carbon-containing material/hard carbon composite.

In addition, the present invention provides material comprising an X/hard carbon composite obtained by the process according to the present invention, wherein X comprises one or more selected from antimony, tin, phosphorus, sulfur, boron, aluminium, gallium, indium, germanium, lead, arsenic, bismuth, titanium, molybdenum, selenium, tellurium, cobalt and nickel in elemental and/or compound form; and wherein X is present in an amount of at least 5% of the X/hard carbon composite.

Preferably, the elemental components of X are located on the outer surface of the hard carbon material, and/or within the micro-size pores in surface of the hard carbon material.

Further, the present invention provides comprising an X/one or more secondary carbon-containing materials/hard carbon composite obtained by the process according to the present invention.

The reaction process of the present invention is preferably performed in the solid state, which in this context is to be interpreted as being in the absence of a solvent or other liquid, or substantially in the absence of a solvent or other liquid, during the heating step (b). For this purpose it is advantageous if the starting materials (the one or more hard carbon starting materials and the one or more starting materials comprising one or more of the component elements of X, and the one or more secondary carbon-containing materials) are mixed together in solid form. It is, however, possible that the starting materials may be combined with a mixing liquid to aid milling and/or to aid in the formation of the mixture of starting materials in step (a), however, this mixing liquid is preferably removed or at least substantially removed, for example by evaporation, carried out at room temperature or at an elevated temperature, optionally under a partial vacuum, prior to the heating step (b). One or more of the starting materials may also be dispersed or dissolved in a fluid (liquid or gas) in step (a).

Advantageously, the materials comprising an X/hard carbon composite made according to the process of the present invention may be used in a negative electrode (anode), in conjunction with a counter electrode and one or more electrolyte materials. The electrolyte materials may be any conventional or known materials and may comprise either aqueous electrolyte(s) or non-aqueous electrolyte(s).

Anode electrodes that comprise materials comprising one or more X/hard carbon composites made according to the present invention are suitable for use in many different applications including sodium ion and/or lithium ion and/or potassium ion cells which may be widely used for example in energy storage devices, such as batteries, rechargeable batteries, electrochemical devices and electrochromic devices.

In a further aspect of the present invention, there is provided a process for preparing X/hard carbon composite using a carbo-thermal reduction reaction.

BRIEF DESCRIPTION OF THE DRAWINGS

The present invention will now be described with reference to the following figures in which.

DETAILED DESCRIPTION

Figure 1A:
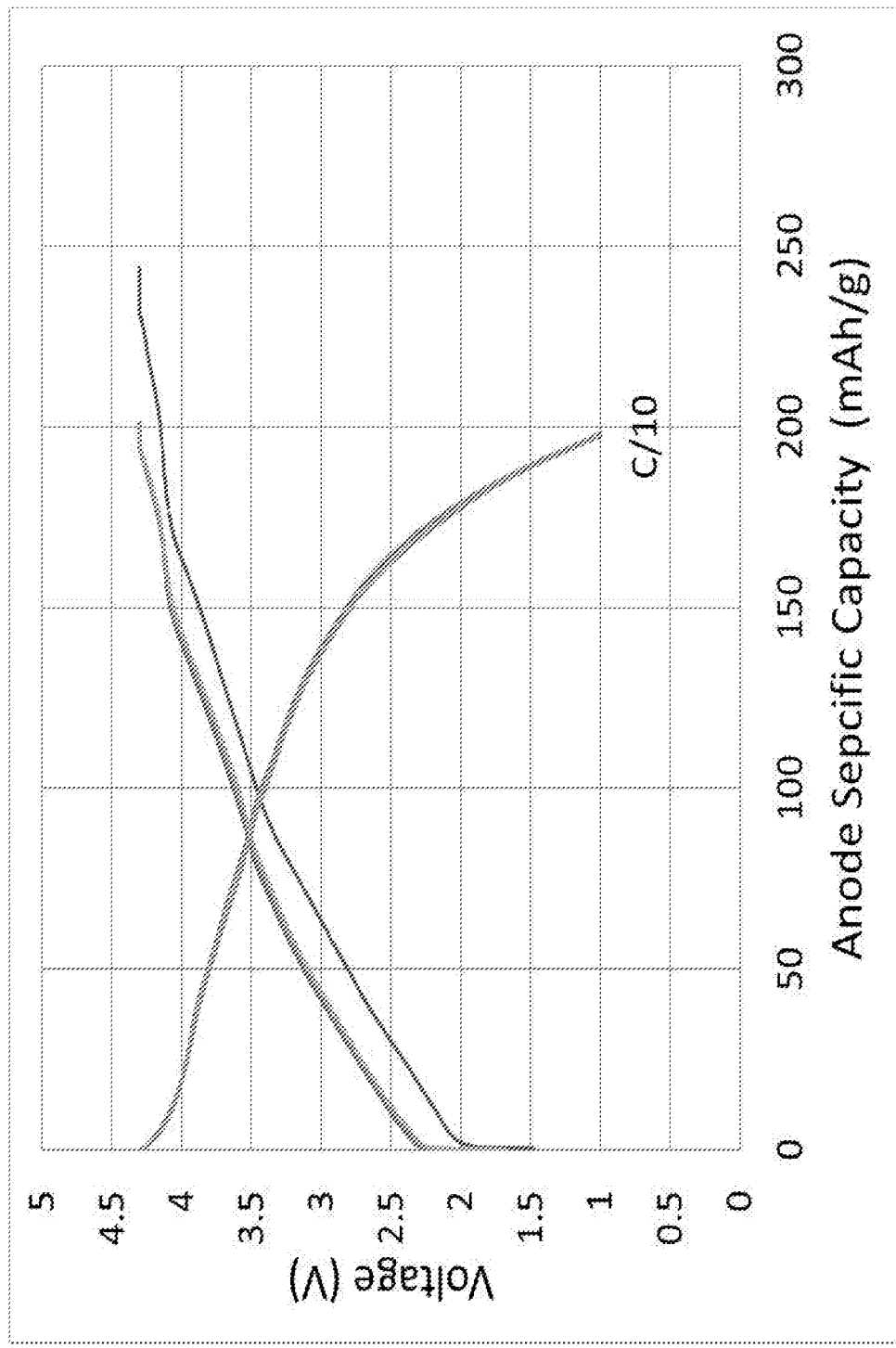
FIG. 1A shows the first 5 charge/discharge voltage profile (Na-ion Cell Voltage [V] versus Anode Specific Capacity [mAh/g]) at a current rate of C/, made according to Example 1 (comparative).

The following process according to the present invention was used to prepare the materials comprising X/hard carbon composite as detailed in Table 1 below:

General Process for Preparing Materials Comprising X/Hard Carbon Composite in Accordance with the Present Invention:

1) Mill the hard carbon to an average particle size of 5-10 μm and the one or more starting materials which comprise one or more of the component elements of X to an average particle size of 1-5 μm;
2) Optionally intimately mix the milled materials together with the one or more secondary carbon-containing materials (in the desired order as discussed above), using suitable mixing apparatus such as a planetary milling machine;
3) Heat the resulting mixture in a furnace under a suitable atmosphere (the gases may be flowing if desired), at a single temperature or over a range of temperatures to facilitate at least partial reduction of one or more of the component elements of X in the one or more starting materials which comprise one or more of the component elements of X.

The precise composition of starting materials and reaction conditions investigated, are detailed for each of Examples 1 to 5 in Table 1 below:

TABLE 1

| Example No. | Target Composition | Starting Materials | Furnace Conditions and Comments | 1st Discharge specific capacity (mAh/g) First cycle Efficiency (%) |
|---|---|---|---|---|
| 1 (COMPARATIVE) | Hard Carbon | Corn Starch | 1200-1500° C. for 2 hours in Ar or $N_2$ atmosphere with a heating/cooling rate of 5° C./min | 198 mAh/g 81% |
| 2 | 10 wt % Sn, 70 wt % Hard Carbon | $SnO_2$ Faradion Hard Carbon, | 800° C. for 4 hours in Ar or $N_2$ atmosphere with a heating/cooling rate of 5° C./min | 290 mAh/g 78% |
| 3 | 30 wt % Sn, 70 wt % Hard Carbon | $SnO_2$ Faradion Hard Carbon, | 800° C. for 4 hours in Ar or $N_2$ atmosphere with a heating/cooling rate of 5° C./min | 470 mAh/g 85% |
| 4 | 10 wt % Sb, 90 wt % Hard Carbon | $Sb_2O_3$, Faradion Hard Carbon, C65 ™ carbon as a reductant | 550° C. for 2 hours in Ar or $N_2$ atmosphere with a heating/cooling rate of 5° C./min | 258 mAh/g 80% |
| 5 | 30 wt % Sb, 70 wt % Hard Carbon | $Sb_2O_3$, Faradion Hard Carbon, C65 ™ carbon as a reductant | 575° C. for 2 hours in Ar or $N_2$ atmosphere with a heating/cooling rate of 5° C./min | 440 mAh/g 94% |
| 6 | 10 wt % Sb, 90 wt % Hard carbon | Ensaco ® 350 g 1.4 wt % $Sb_2O_3$ 11.6 wt % Hard Carbon 87 wt % | 525° C. for 2 hours in Ar or $N_2$ atmosphere with a heating/cooling rate of 5° C./min | 400 mAh/g >90% |

Product Analysis Using XRD

Analysis by X-ray diffraction techniques was conducted using a Siemens D5000 powder diffractometer to confirm that the desired target materials had been prepared, to establish the phase purity of the product material and to determine the types of impurities present. From this information it is possible to determine the lattice parameters of the unit cells.

The general XRD operating conditions used to analyse the materials are as follows:
Slits sizes: 2 mm, 2 mm, 0.2 mm
Range: $2\theta = 10°$-$60°$
X-ray Wavelength=1.5418 Å (Angstroms) (Cu Kα)
Speed: 1.0 seconds/step
Increment: 0.025°
Electrochemical Results Anodes comprising X/hard carbon composite made according to Examples 1 to 5 are prepared by solvent-casting a slurry of the X/hard carbon composite (made using proprietary (i.e. not commercially available) Faradion hard carbon material derived from pyrolysed corn starch, as described above), conductive carbon, binder and solvent. The conductive carbon used is C65™ carbon (Timcal). PVdF is a suitable binder, and N-Methyl-2-pyrrolidone (NMP) may be employed as the solvent. The slurry is then cast onto aluminium foil and heated until most of the solvent evaporates and an electrode film is formed. The anode electrode is then dried further under dynamic vacuum at about 120° C. The electrode film contains the following components, expressed in percent by weight: 88% X/hard carbon, 3% C65™ carbon, and 9% PVdF binder.

To allow direct comparison between all of the electrochemical results, the same cathode (herein referred to as "the standard cathode") is used when testing each of the Examples 1 to 5. The standard cathode comprising a suitable cathode active material, is prepared by solvent-casting a slurry of the cathode active material, conductive carbon, binder and solvent. The conductive carbon used is C65™ carbon (Timcal). PVdF is conveniently used as the binder, and N-Methyl-2-pyrrolidone (NMP) may be employed as the solvent. The slurry is then cast onto aluminium foil and heated until most of the solvent evaporates and an electrode film is formed. The standard cathode electrode is then dried under dynamic vacuum at about 120° C. The electrode film contains the following components, expressed in percent by weight: 88% cathode active material, 6% C65™ carbon, and 6% PVdF binder.

Cell Testing

The cells are tested as follows using Constant Current Cycling techniques.

The cell is cycled at a given current density between pre-set voltage limits. A commercial battery cycler from MTI Inc. (Richmond, Calif., USA) is used. On charge, alkali ions are inserted into the X/hard carbon anode material. During discharge, alkali ions are extracted from the anode and re-inserted into the cathode active material.

The cell cycling results are shown as a function of anode specific capacity (rather than cathode specific capacity) as this is more informative for this application. The anode specific capacity is calculated by multiplying the cathode specific capacity by the (cathode:anode) mass balance.

Discussion of the Results

Example 1 (Comparative): Faradion Hard Carbon Used Alone as an Anode

Target Composition: Faradion Hard Carbon

Figure 1B:
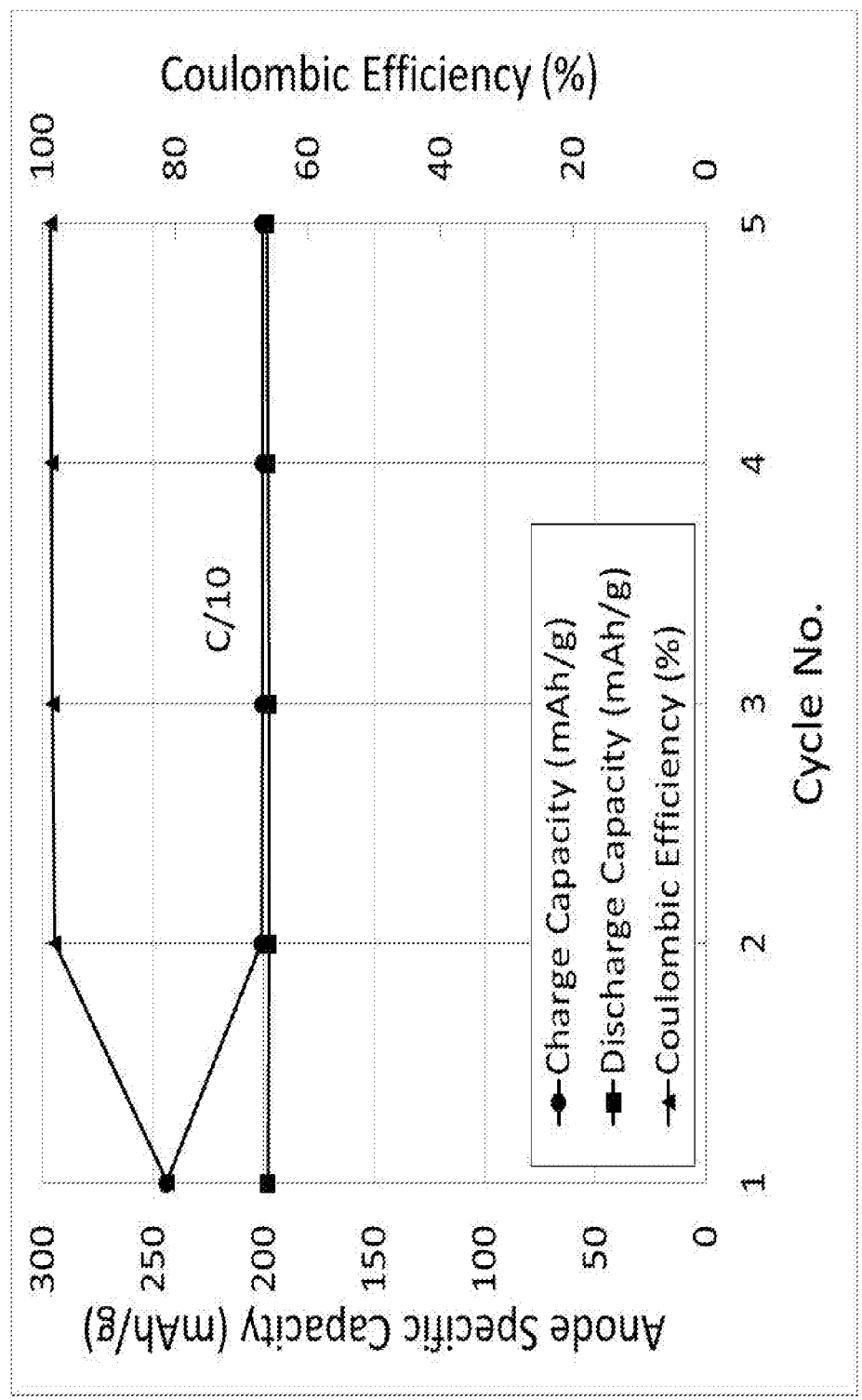
FIG. 1B shows the cycle life performance (Anode specific capacity (mAh/g) versus cycle number) for the hard carbon// standard cathode cell at a current rate of C/10, made according to the Example 1 (comparative).
Figure 1C:
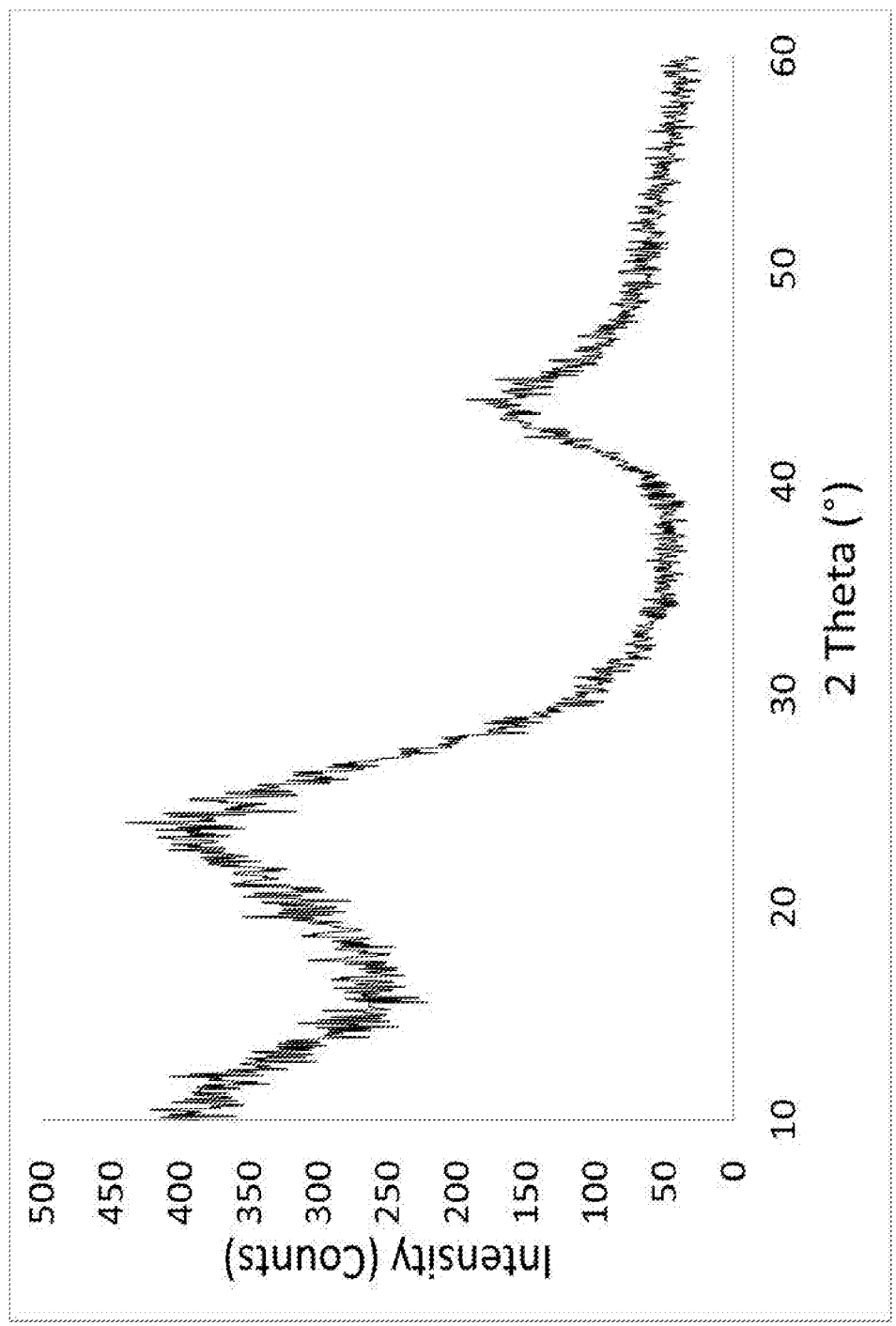
FIG. 1C shows the XRD results for the hard carbon material, made according to the Example 1 (comparative).

The data shown in FIGS. 1A and 1B are derived from the constant current cycling data for a Faradion Hard Carbon materials in a Na-ion cell where this Anode material was coupled with the standard cathode. The electrolyte used is a 0.5 M solution of $NaPF_6$ in propylene carbonate (PC), ethylene carbonate (EC) and diethyl carbonate (DEC) 1:1:2 by weight. The constant current data were collected at an approximate a current rate of C/10 between voltage limits of 1.00 and 4.30 V. To ensure that the Na-ion cell was fully charged, the cell was potentiostatically held at 4.30 V at the end of the constant current charging process until the current density dropped to 10% of the constant current value. The testing was carried out at 30° C. During the cell charging process, sodium ions are extracted from the cathode active material, and inserted into the hard carbon anode. During the subsequent discharge process, sodium ions are extracted from the hard carbon and re-inserted into the cathode active material in the standard cathode.

FIG. 1A shows the first 5 charge/discharge voltage profile (Na-ion Cell Voltage [V] versus Anode Specific Capacity [mAh/g]) at a current rate of C/10. The anode specific capacity in the first discharge specific capacity is 198 mAh/g.

FIG. 1B shows the cycle life performance (Anode specific capacity (mAh/g) versus cycle number) for the hard carbon composite//standard cathode cell at a current rate of C/10. The cell shows good first cycle efficiency of around 81%, and good reversiblity but the anode specific capacity is fairly low at 198 mAh/g after 5 cycles.

FIG. 10 shows the XRD results for the target Faradion Hard Carbon.

Example 2: Target Composition: 10 wt % Sn, 90 wt % Hard Carbon

Starting materials: $SnO_2$ and Faradion Hard Carbon (derived from pyrolysed corn starch).

Figure 2A:
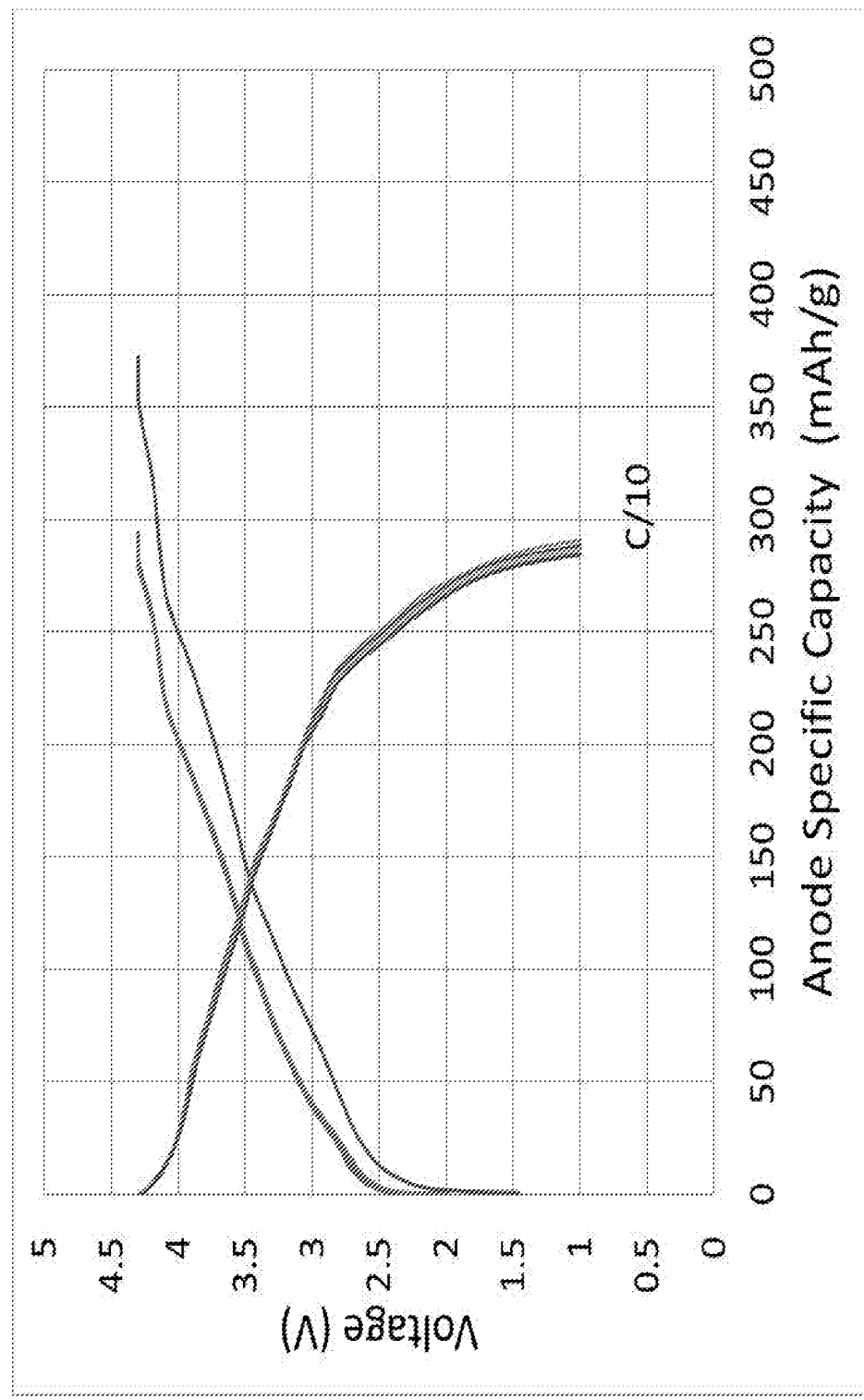
FIG. 2A shows the first 5 charge/discharge voltage profile (Na-ion Cell Voltage [V] versus Anode Specific Capacity [mAh/g]) at a current rate of C/10, for the Sn/Hard carbon composite made according to Example 2.
Figure 2B:
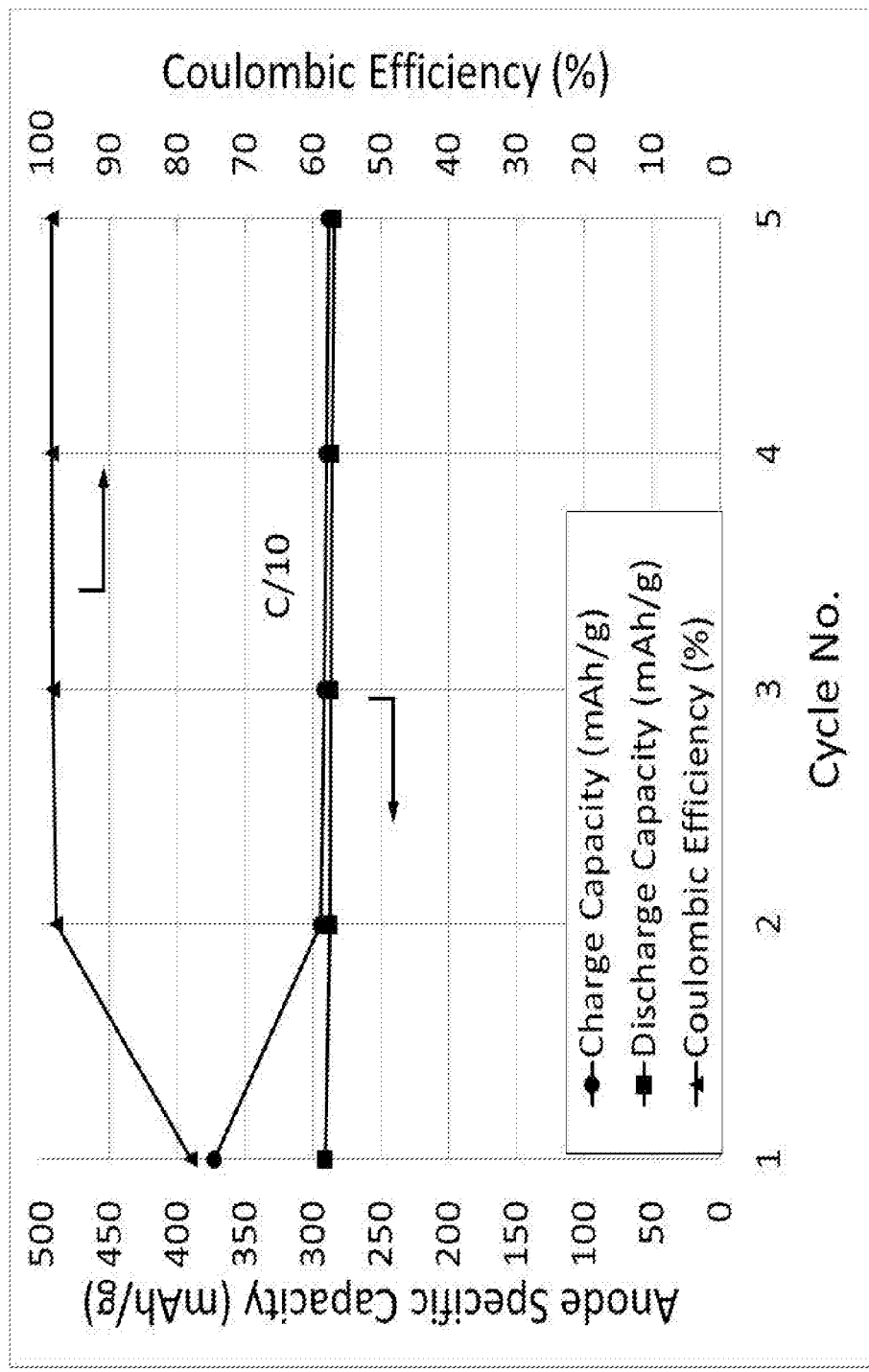
FIG. 2B shows the cycle life performance (Anode specific capacity (mAh/g) versus cycle number) for the hard carbon composite//standard cathode cell at a current rate of C/10, for the Sn/Hard carbon composite made according to Example 2.

The data shown in FIGS. 2A, 2B are derived from the constant current cycling data for a Hard Carbon composite (Sn 10 wt %, Hard Carbon 90 wt %) materials in a Na-ion cell where this Anode materials was coupled with the standard cathode material. The electrolyte used is a 0.5 M solution of $NaPF_6$ in propylene carbonate (PC), ethylene carbonate (EC) and diethylcarbonate (DEC) 1:1:2 by weight. The constant current data were collected at an approximate a current rate of C/10 between voltage limits of 1.00 and 4.30 V. To ensure that the Na-ion cell was fully charged, the cell was potentiostatically held at 4.30 V at the end of the constant current charging process until the current density dropped to 10% of the constant current value. The testing was carried out at 30° C. During the cell charging process, sodium ions are extracted from the cathode active material, and inserted into the hard carbon anode. During the subsequent discharge process, sodium ions are extracted from the hard carbon and re-inserted into the cathode active material.

FIG. 2A shows the first 5 charge/discharge voltage profile (Na-ion Cell Voltage [V] versus Anode Specific Capacity [mAh/g]) at a current rate of C/10. The anode specific capacity in the first discharge specific capacity is 290 mAh/g. This shows that the presence of 10% tin markedly improves the first discharge specific capacity relative to the discharge specific capacity of hard carbon alone (Example 1 (comparative)).

FIG. 2B shows the cycle life performance (Anode specific capacity (mAh/g) versus cycle number) for the hard carbon composite//standard cathode cell at a current rate of C/10. The cell shows a reasonable first cycle efficiency of around 78%, and excellent reversiblity in which the anode specific capacity is 285 mAh/g after 5 cycles.

Figure 2C:
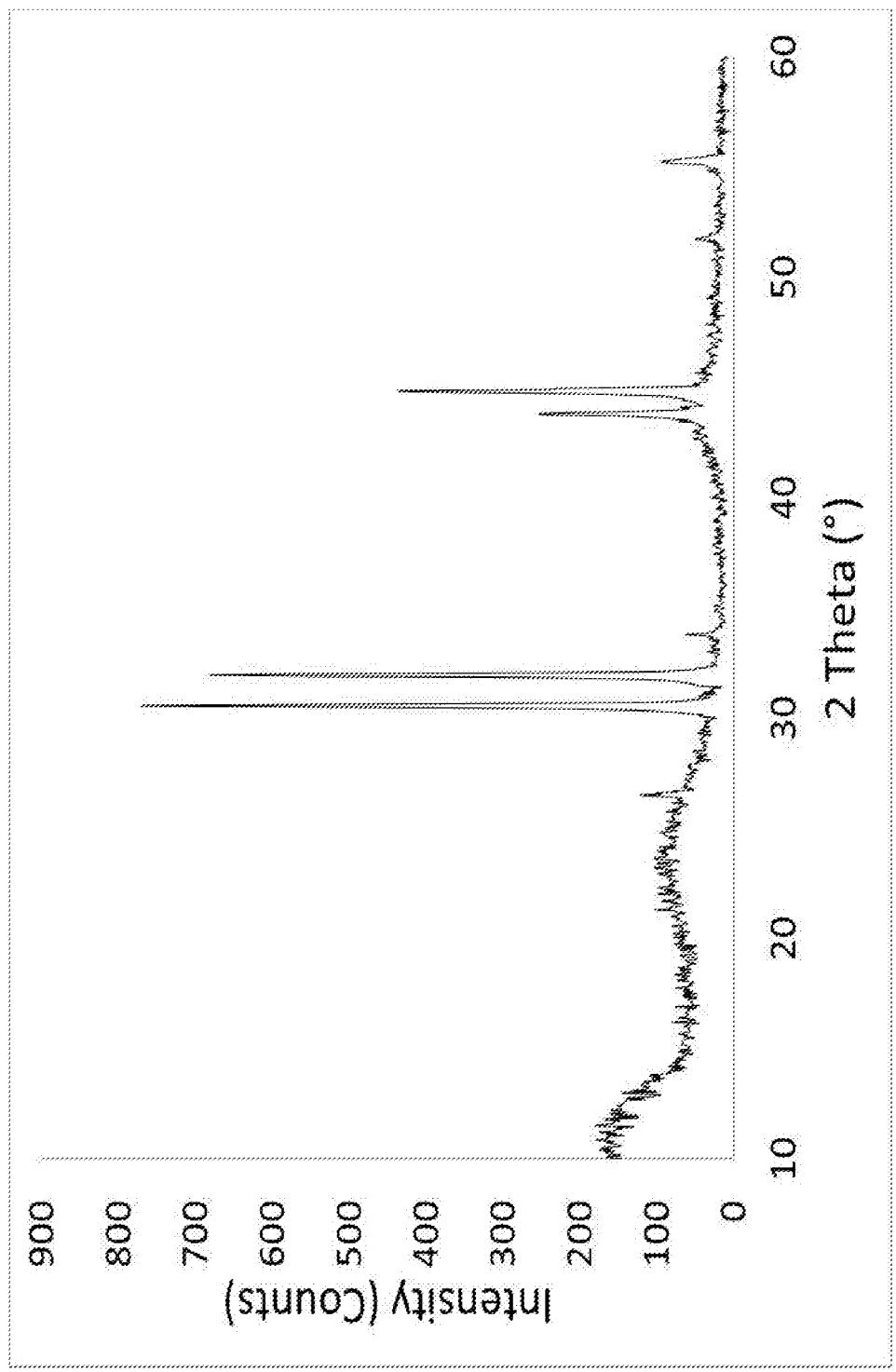
FIG. 2C shows the XRD results for the 10 wt % Sn+90 wt % Hard Carbon composite, made according to Example 2.

FIG. 2C shows the XRD results for target 10 wt % Sn+90 wt % Hard Carbon composite, made according to Example 2.

Example 3

Target composition: 30 wt % Sn, 70 wt % Hard Carbon
Starting materials: $SnO_2$, Faradion Hard Carbon (derived from pyrolysed corn starch.

Figure 3A:
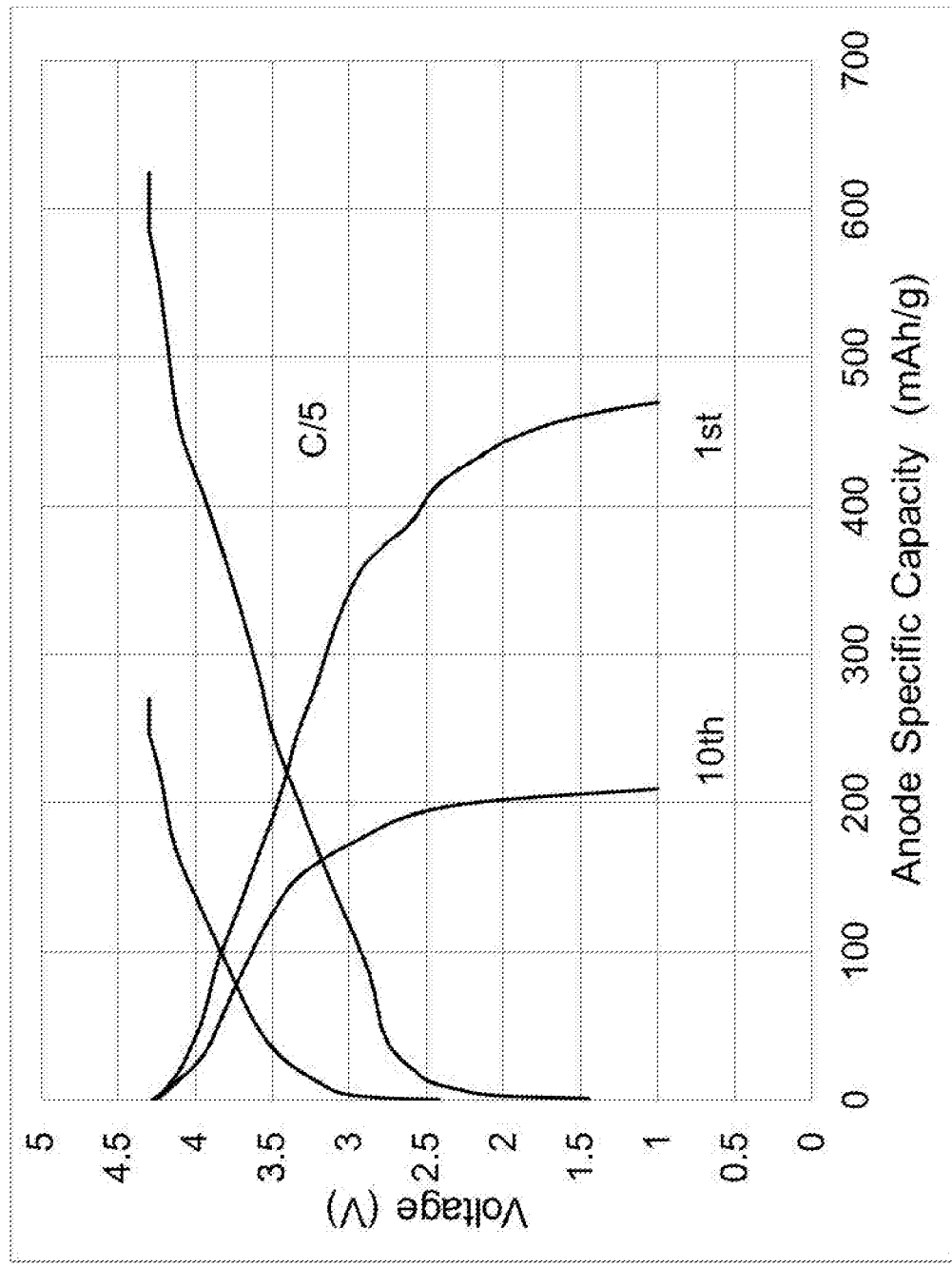
FIG. 3A shows the first 5 charge/discharge voltage profile (Na-ion Cell Voltage [V] versus Anode Specific Capacity [mAh/g]) at a current rate of C/5, for the Sn/Hard carbon composite made according to Example 3.
Figure 3B:
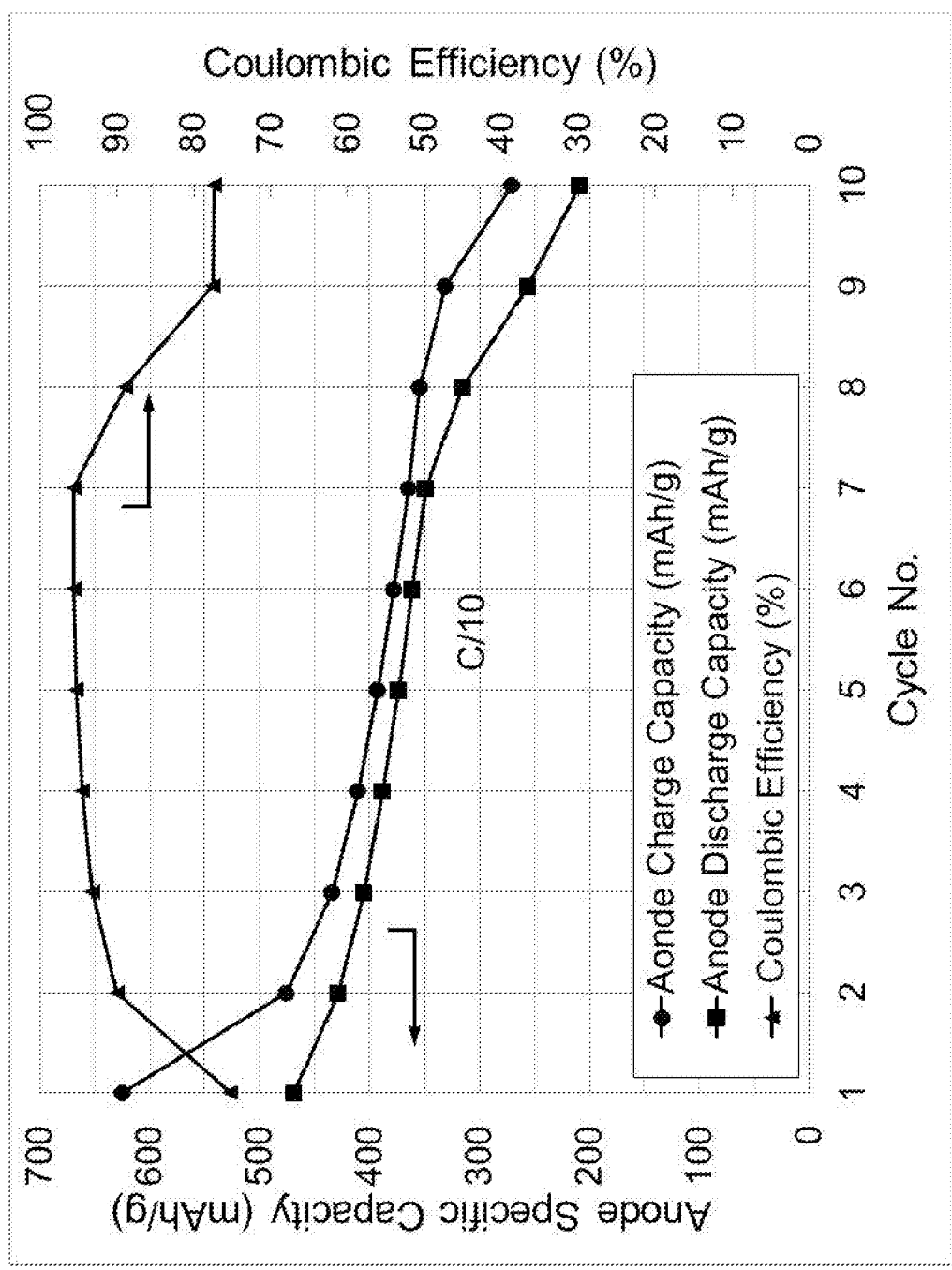
FIG. 3B shows the cycle life performance (Anode specific capacity (mAh/g) versus cycle number) for the hard carbon composite//standard cathode cell at a current rate of C/5, for the Sn/Hard carbon composite made according to Example 3.

The data shown in FIGS. 3A, 3B are derived from the constant current cycling data for a Hard Carbon composite (Sn 30 wt %, Hard Carbon 70 wt %) materials in a Na-ion cell where this Anode materials was coupled with the standard cathode material. The electrolyte used is a 0.5 M solution of $NaPF_6$ in propylene carbonate (PC), ethylene carbonate (EC) and diethylcarbonate (DEC) 1:1:2 by weight. The constant current data were collected at an approximate a current rate of C/10 between voltage limits of 1.00 and 4.30 V. To ensure that the Na-ion cell was fully charged, the cell was potentiostatically held at 4.30 V at the end of the constant current charging process until the current density dropped to 10% of the constant current value. The testing was carried out at 30° C. During the cell charging process, sodium ions are extracted from the standard cathode active material, and inserted into the hard carbon anode. During the subsequent discharge process, sodium ions are extracted from the hard carbon and re-inserted into the standard cathode active material. A mass balance C/A of about 4 was applied, i.e. the weight of the cathode (C) is four times that of the weight of the anode (A) in a full Na-ion cell.

FIG. 3A shows the $1^{st}$ and $10^{th}$ charge/discharge voltage profile (Na-ion Cell Voltage [V] versus Anode Specific Capacity [mAh/g]) at a current rate of C/5. The anode first discharge specific capacity is an excellent 470 mAh/g. This shows that the use of 30% tin in the hard carbon composite improves the discharge specific capacity performance by over 62% as compared against the hard carbon composite which contains 10% tin (Example 2) and by over 137% when compared against the hard carbon material alone (Example 1 (comparative)).

FIG. 3B shows the cycle life performance (Anode specific capacity (mAh/g) versus cycle number) for the hard carbon composite//Faradion cathode cell at a current rate of C/10. The cell shows good first cycle efficiency of around 85%, good reversiblity and the anode specific capacity is 210 mAh/g after 10 cycles.

Figure 3C:
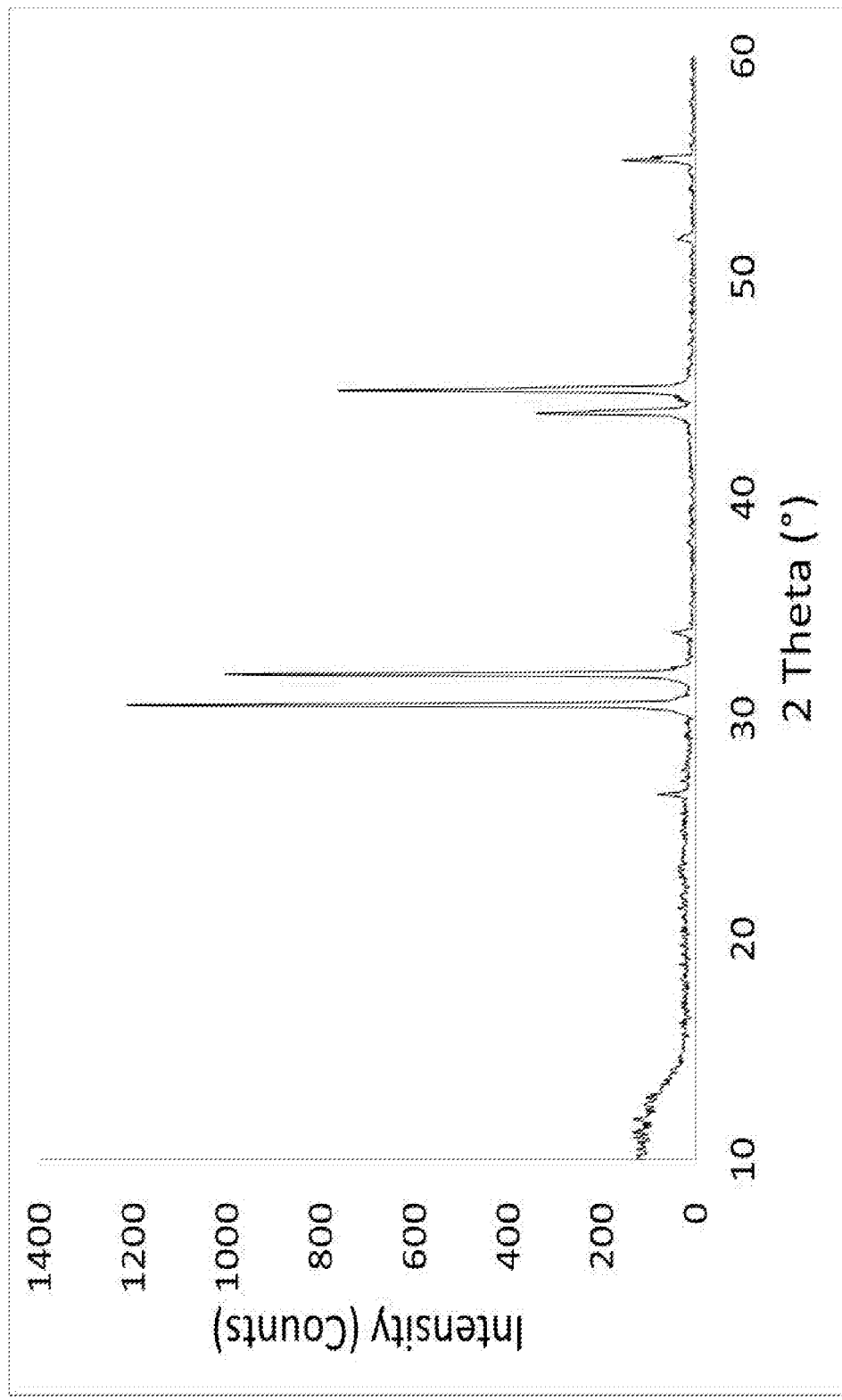
FIG. 3C shows the XRD results for the 30 wt % Sn+70 wt % Hard Carbon composite, made according to Example 3.

FIG. 3C shows the XRD results for the target 30 wt % Sn+70 wt % Hard Carbon composite, made accoding to Example 3.

Example 4

Target composition: 10 wt % Sb, 90 wt % Hard Carbon
Starting materials: $Sb_2O_3$, Faradion Hard Carbon (derived from pyrolysed corn starch), C65™ carbon as the reductant (secondary carbon material).

Figure 4A:
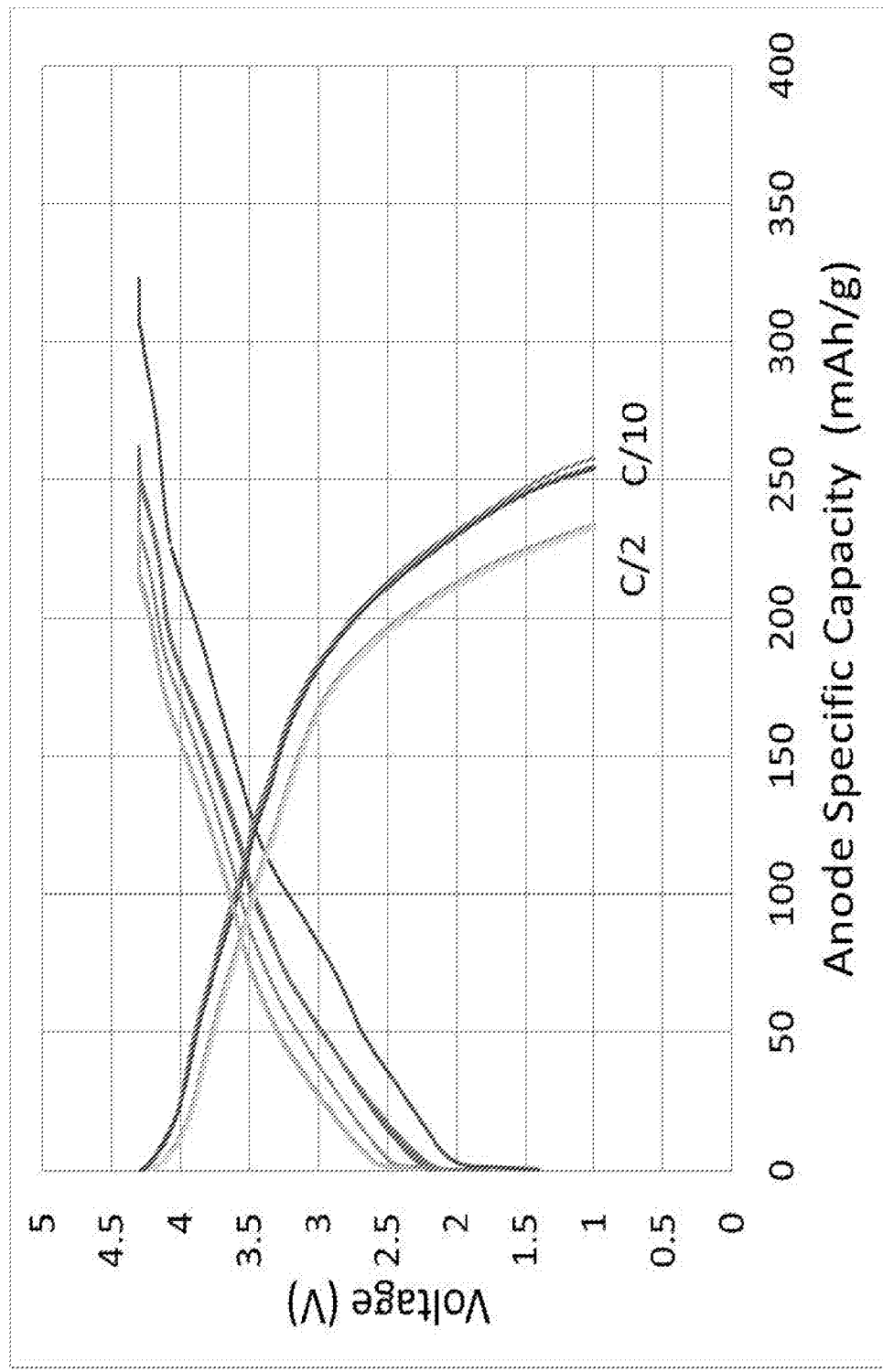
FIG. 4A shows the first 5 charge/discharge voltage profile (Na-ion Cell Voltage [V] versus Anode Specific Capacity [mAh/g]) at a current rate of C/10 and followed by another 5 charge/discharge cycles at a current rate of C/2, for the Sb/Hard carbon composite material made according to Example 4.
Figure 4B:
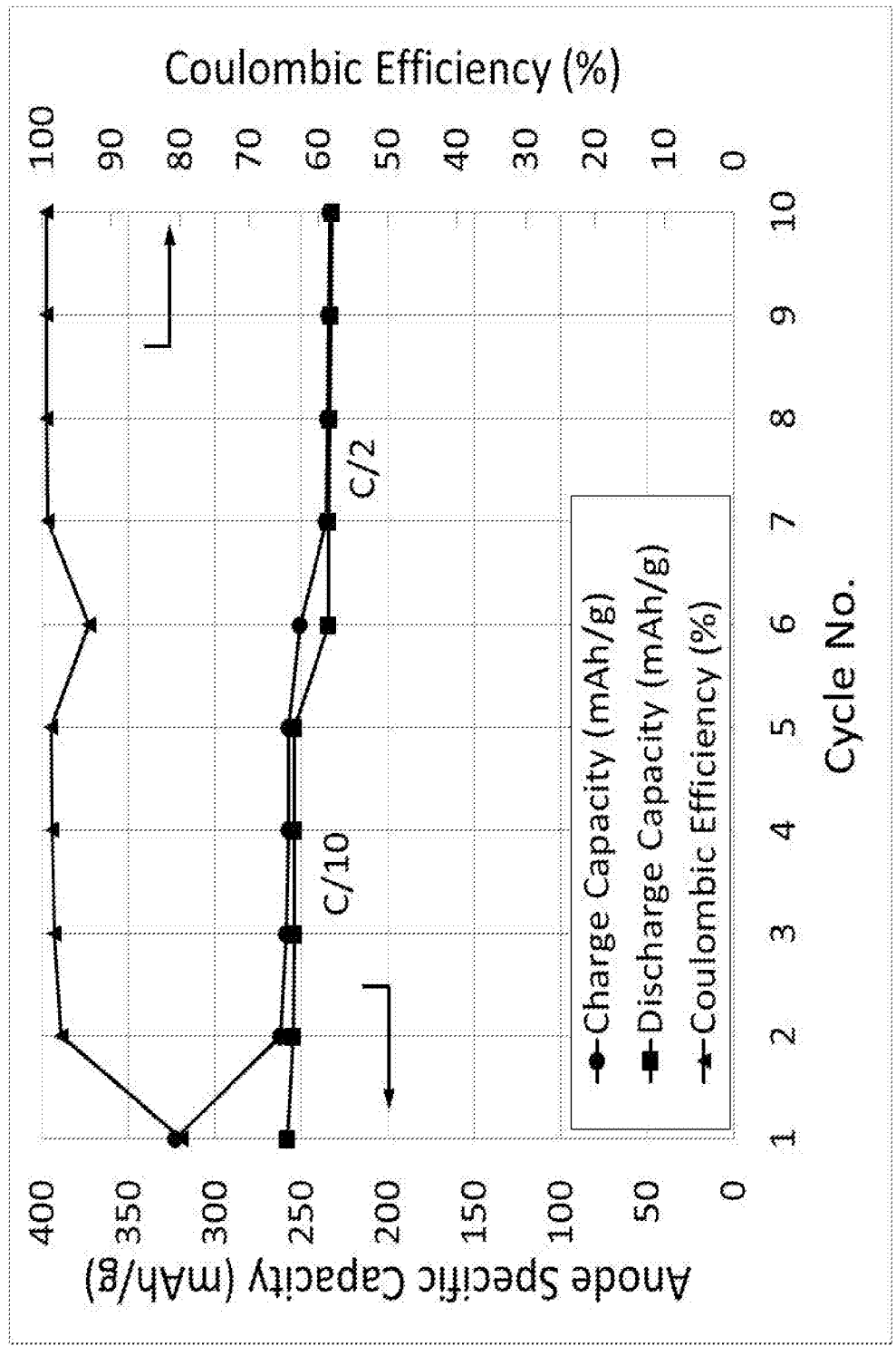
FIG. 4B shows the cycle life performance (Anode specific capacity (mAh/g) versus cycle number) for the hard carbon composite//standard cathode cell at a current rate of C/10 and C/2, for the Sb/Hard carbon composite material made according to Example 4 with a secondary carbon-containing material.

The data shown in FIGS. 4A and 4B are derived from the constant current cycling data for a Hard Carbon composite (Sb 10 wt %, Hard Carbon 90 wt %) materials in a Na-ion cell where this Anode material was coupled with the standard cathode. The electrolyte used is a 0.5 M solution of $NaPF_6$ in propylene carbonate (PC), ethylene carbonate (EC) and diethylcarbonate (DEC) 1:1:2 by weight. The constant current data were collected at an approximate a current rate of C/10 between voltage limits of 1.00 and 4.30

V. To ensure that the Na-ion cell was fully charged, the cell was potentiostatically held at 4.30 V at the end of the constant current charging process until the current density dropped to 10% of the constant current value. The testing was carried out at 30° C. During the cell charging process, sodium ions are extracted from the cathode active material, and inserted into the hard carbon anode. During the subsequent discharge process, sodium ions are extracted from the hard carbon and re-inserted into the cathode active material in the standard cathode.

FIG. 4A shows the first 5 charge/discharge voltage profile (Na-ion Cell Voltage [V] versus Anode Specific Capacity [mAh/g]) at a current rate of C/10 and followed by another 5 charge/discharge cycle at a current rate of C/2. The anode specific capacity in the first discharge specific capacity is 258 mAh/g. This is a similar improvement over hard carbon alone to that observed for tin.

FIG. 4B shows the cycle life performance (Anode specific capacity (mAh/g) versus cycle number) for the hard carbon composite//standard cathode cell at a current rate of C/10 and C/2. The cell shows improved first cycle retention of around 80%, and good reversiblity in which the anode specific capacity is 253 mAh/g after 5 cycles.

Figure 4C:
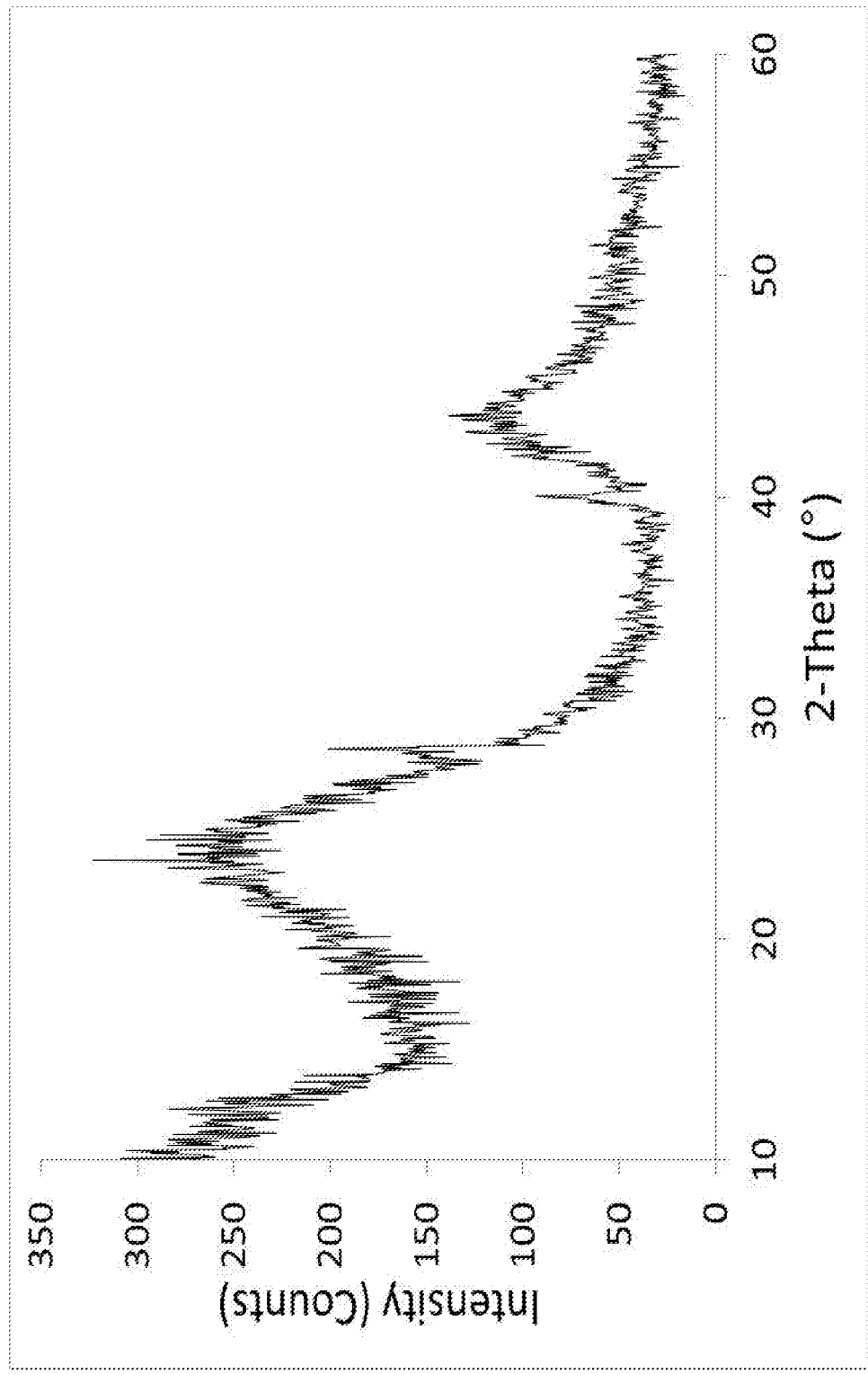
FIG. 4C shows the XRD results for the Sb/Hard carbon composite material containing 10 wt % Sb+90 wt %, made according to Example 4.

FIG. 4C shows the XRD results for the target 10 wt % Sb+90 wt % Hard Carbon composite material prepared according to Example 4.

Example 5

Target composition: 30 wt % Sb, 70 wt % Hard Carbon
Starting materials: $Sb_2O_3$, Faradion Hard Carbon (derived from pyrolysed corn starch), C65™ carbon as the reductant (secondary carbon material)

Figure 5A:
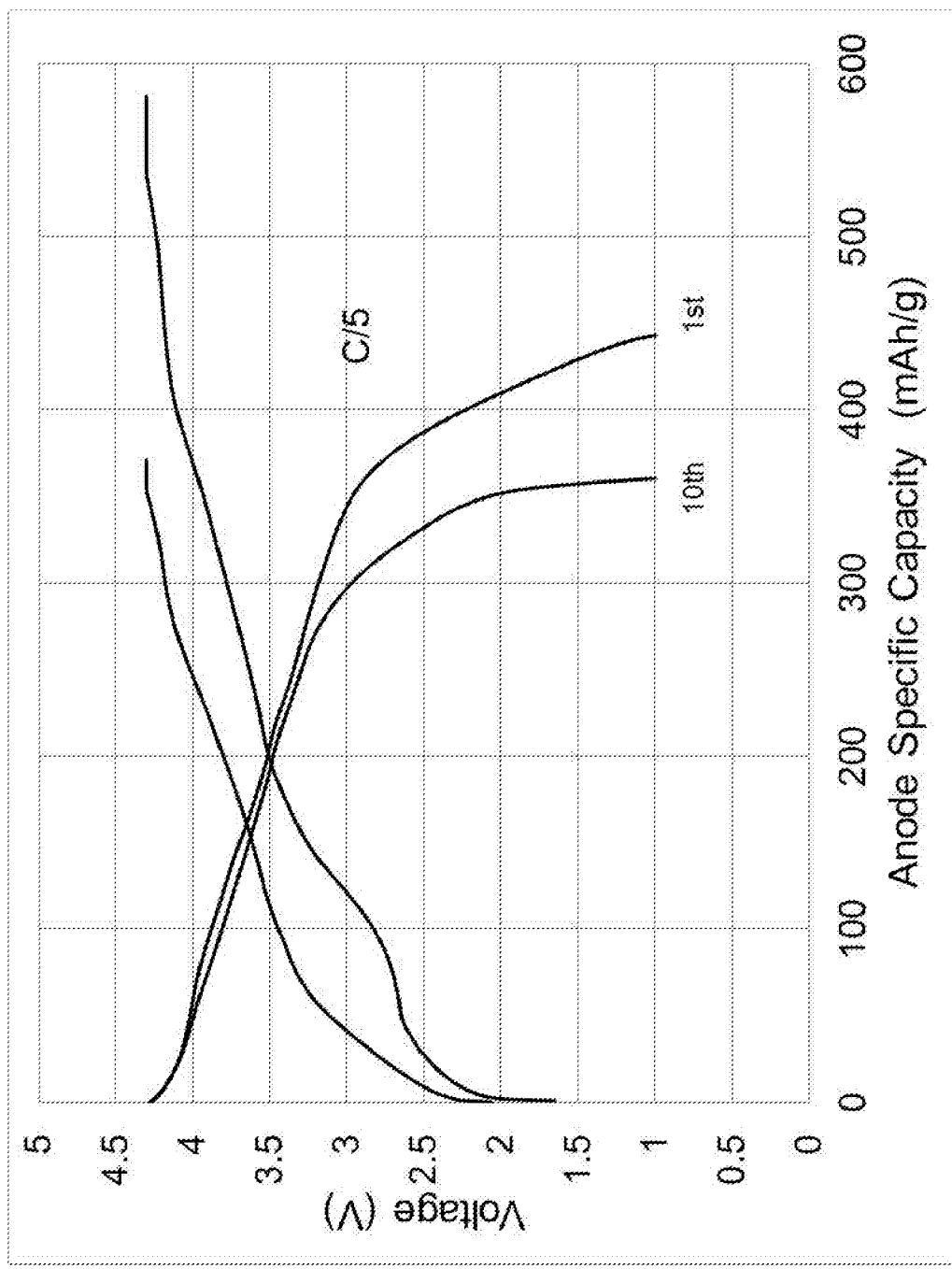
FIG. 5A shows the first 5 charge/discharge voltage profile (Na-ion Cell Voltage [V] versus Anode Specific Capacity [mAh/g]) at a current rate of C/5, for the Sb/Hard carbon composite, made according to Example 5.
Figure 5B:
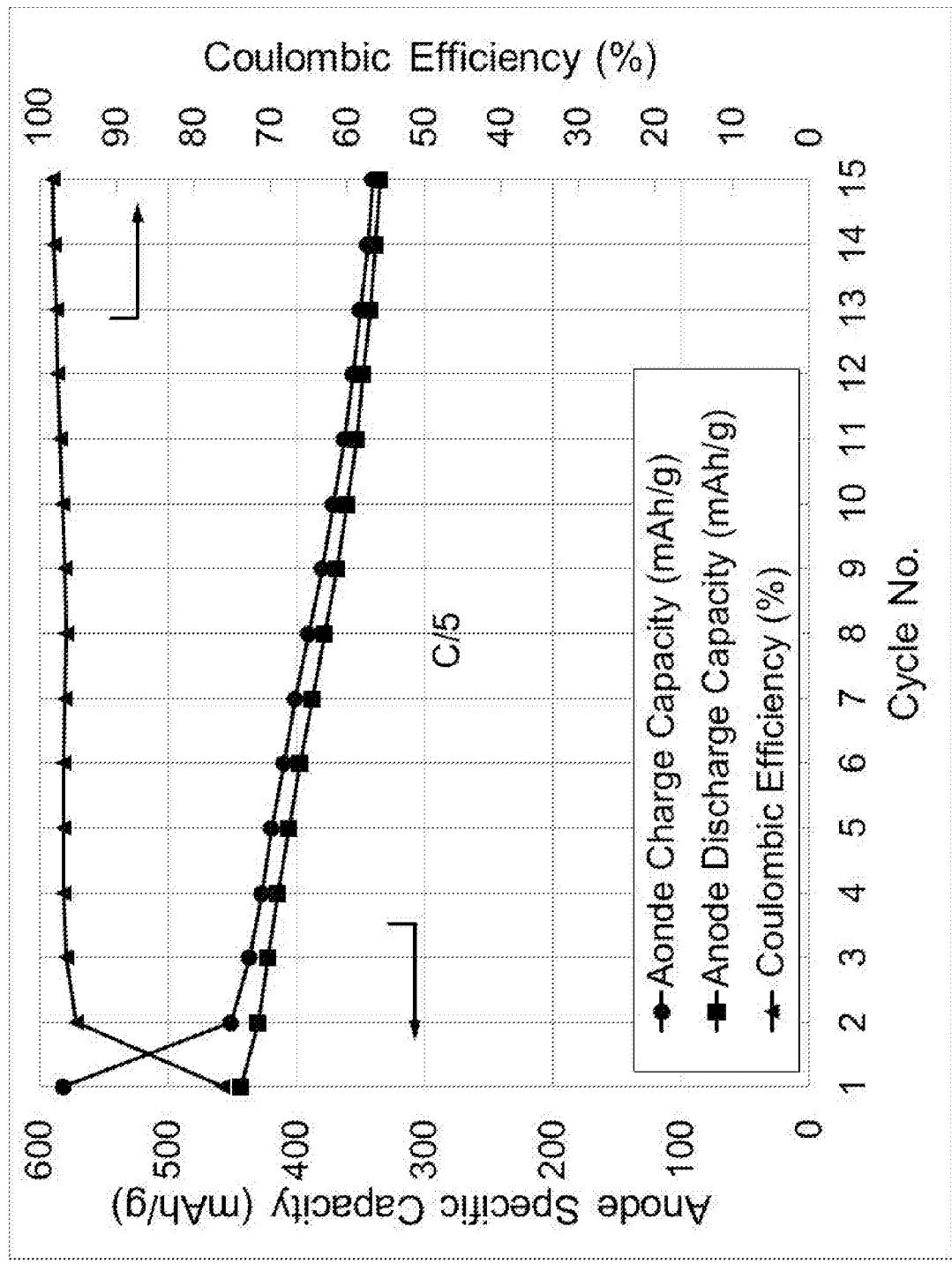
FIG. 5B shows the cycle life performance (Anode specific capacity (mAh/g) versus cycle number) for the hard carbon composite//standard cathode cell at a current rate of C/5, for the Sb/Hard carbon composite made according to Example 5.

The data shown in FIGS. 5A, 5B are derived from the constant current cycling data for a Hard Carbon composite (Sb 30 wt %, Hard Carbon 70 wt %) materials in a Na-ion cell where this Anode materials was coupled with the standard cathode material. The electrolyte used is a 0.5 M solution of $NaPF_6$ in propylene carbonate (PC), ethylene carbonate (EC) and diethylcarbonate (DEC) 1:1:2 by weight. The constant current data were collected at an approximate a current rate of C/10 between voltage limits of 1.00 and 4.30 V. To ensure that the Na-ion cell was fully charged, the cell was potentiostatically held at 4.30 V at the end of the constant current charging process until the current density dropped to 10% of the constant current value. The testing was carried out at 30° C. During the cell charging process, sodium ions are extracted from the cathode active material, and inserted into the hard carbon anode. During the subsequent discharge process, sodium ions are extracted from the hard carbon and re-inserted into the standard cathode active material. A mass balance C/A of about 4 was applied, i.e. the weight of the cathode (C) is four times that of the weight of the anode (A) in a full Na-ion cell.

FIG. 5A shows the $1^{st}$ and $10^{th}$ charge/discharge voltage profile (Na-ion Cell Voltage [V] versus Anode Specific Capacity [mAh/g]) at a current rate of C/5. The anode specific capacity in the first discharge specific capacity is an excellent 440 mAh/g. This result is comparable to that observed for a 30% tin containing hard carbon composite.

FIG. 5B shows the cycle life performance (Anode specific capacity (mAh/g) versus cycle number) for the hard carbon composite//standard cathode cell at a current rate of C/5. The cell shows a superb first cycle efficiency of around 94%, and good reversiblity in which the anode specific capacity is 330 mAh/g after 15 cycles.

Figure 5C:
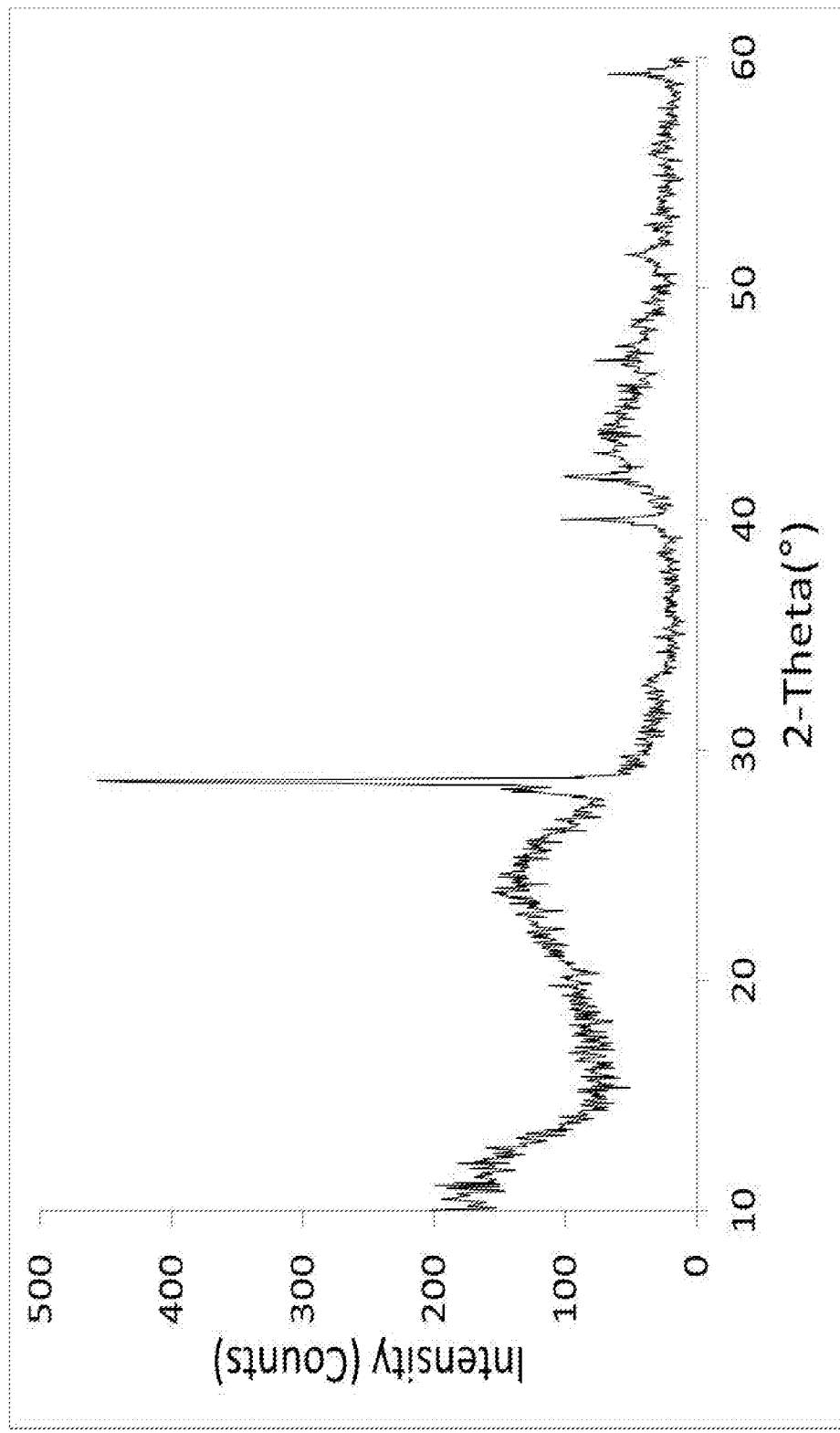
FIG. 5C shows the XRD results for the Sb/Hard carbon composite containing 30 wt % Sb+70 wt %, made according to Example 5 with a secondary carbon-containing material.

FIG. 5C shows the XRD results for the target 30 wt % Sb+70 wt % Hard Carbon composite made according to Example 5.

Example 6

Target composition: 10 wt % Sb, 90 wt % Hard Carbon
Starting materials: Ensacor® 350 g, $Sb_2O_3$, on Hard Carbon.

Figure 6A:
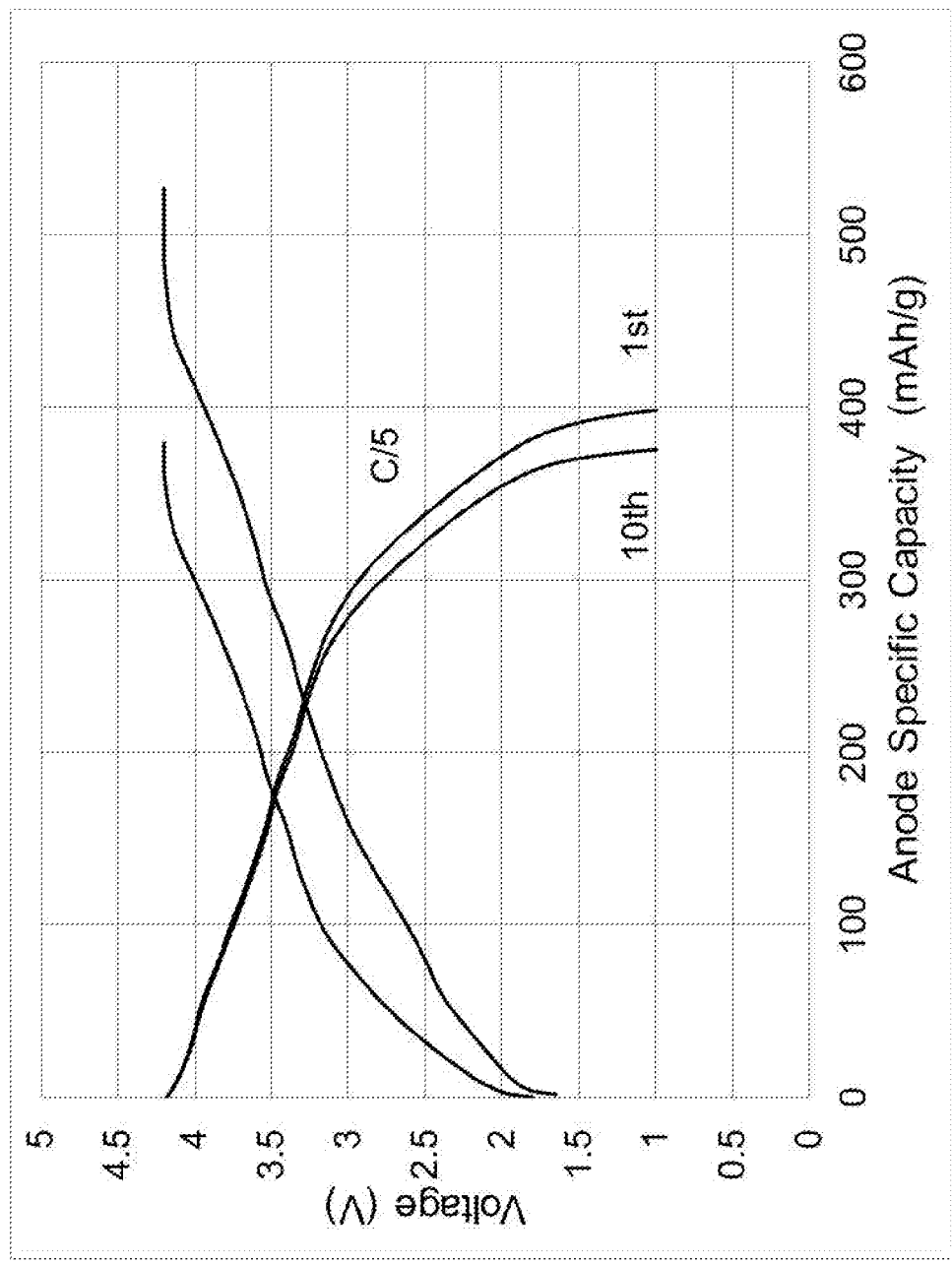
FIG. 6A shows the $1^{st}$ and $10^{th}$ charge/discharge voltage profile (Na-ion cell Voltage [V] versus Anode Specific Capacity [mAh/g]) at a current rate of C/5, for the Sb/Hard carbon composite made according to Example 6.
Figure 6B:
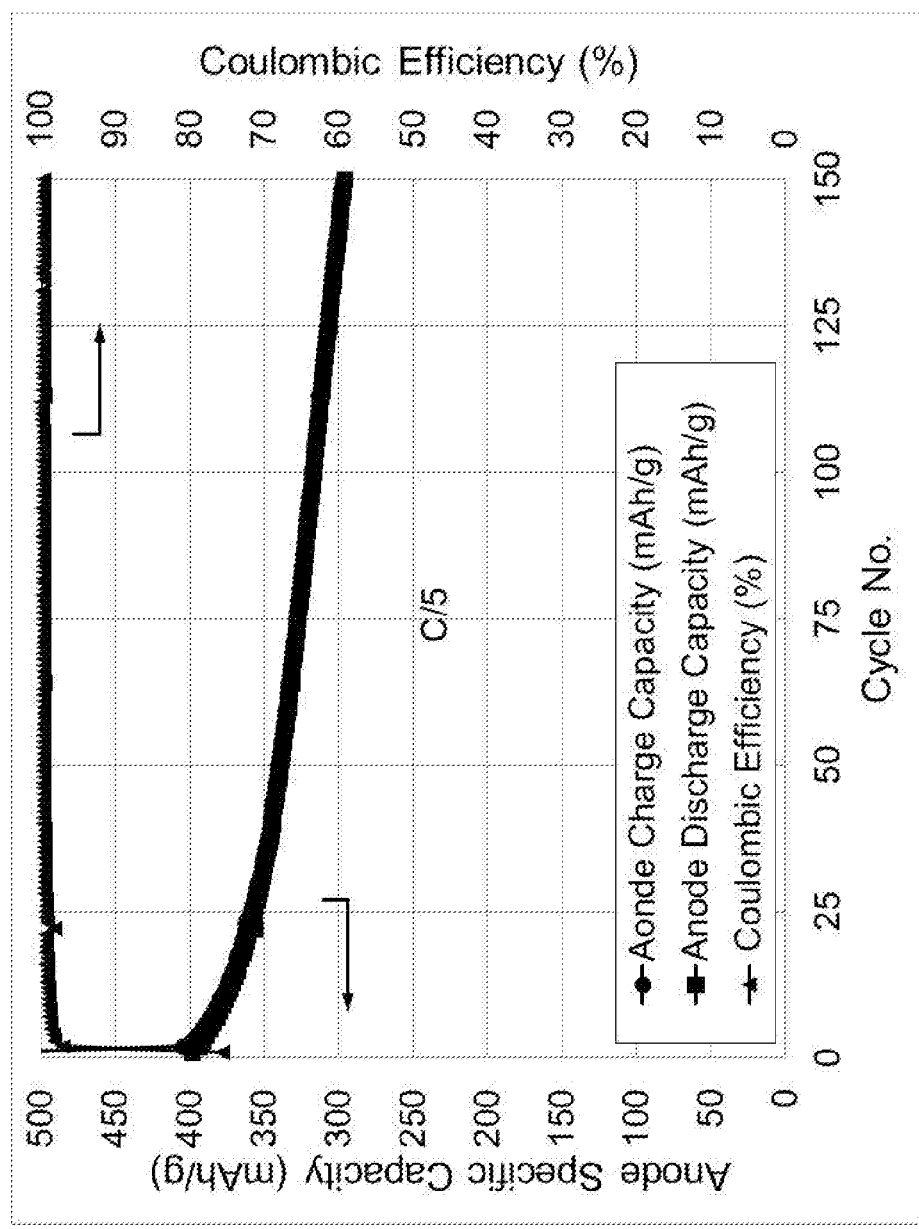
FIG. 6B shows the cycle life performance (Anode specific capacity (mAh/g) versus cycle number) for the hard carbon composite//standard cathode cell at a current rate of C/5 up to 100 cycles, made according to the Example 6.

The data shown in FIGS. 6A and 6B are derived from the constant current cycling data for a Hard Carbon composite (Sb 10 wt %, Hard Carbon 90 wt %) materials in a Na-ion cell where this Anode materials was coupled with the a standard cathode material. The electrolyte used is a 0.5 M solution of $NaPF_6$ in propylene carbonate (PC), ethylene carbonate (EC) and diethylcarbonate (DEC) 1:1:2 by weight. The constant current data were collected at an approximate a current rate of C/10 between voltage limits of 1.00 and 4.20 V. To ensure that the Na-ion cell was fully charged, the cell was potentiostatically held at 4.20 V at the end of the constant current charging process until the current density dropped to 10% of the constant current value. The testing was carried out at 30° C. During the cell charging process, sodium ions are extracted from the standard cathode active material, and inserted into the hard carbon anode. During the subsequent discharge process, sodium ions are extracted from the hard carbon and re-inserted into the standard cathode active material. A mass balance C/A of about 3.5 was applied, i.e. the weight of the cathode (C) is 3.5 times that of the weight of the anode (A) in a full Na-ion cell.

FIG. 6A shows the $1^{st}$ and $10^{th}$ charge/discharge voltage profile (Na-ion Cell Voltage [V] versus Anode Specific Capacity [mAh/g]) at a current rate of C/5 for the Sb/hard carbon composite.

Advantageously, the anode specific capacity in the first discharge specific capacity for this Sb/hard carbon composite is about 400 mAh/g.

FIG. 6B shows the cycle life performance (Anode specific capacity (mAh/g) versus cycle number) for the hard carbon composite//Faradion cathode cell at a current rate of C/5. The cell shows an extremely high first discharge efficiency of over 90% and discharge capacity efficiency after 150 cycles of 75%.

Figure 6C:
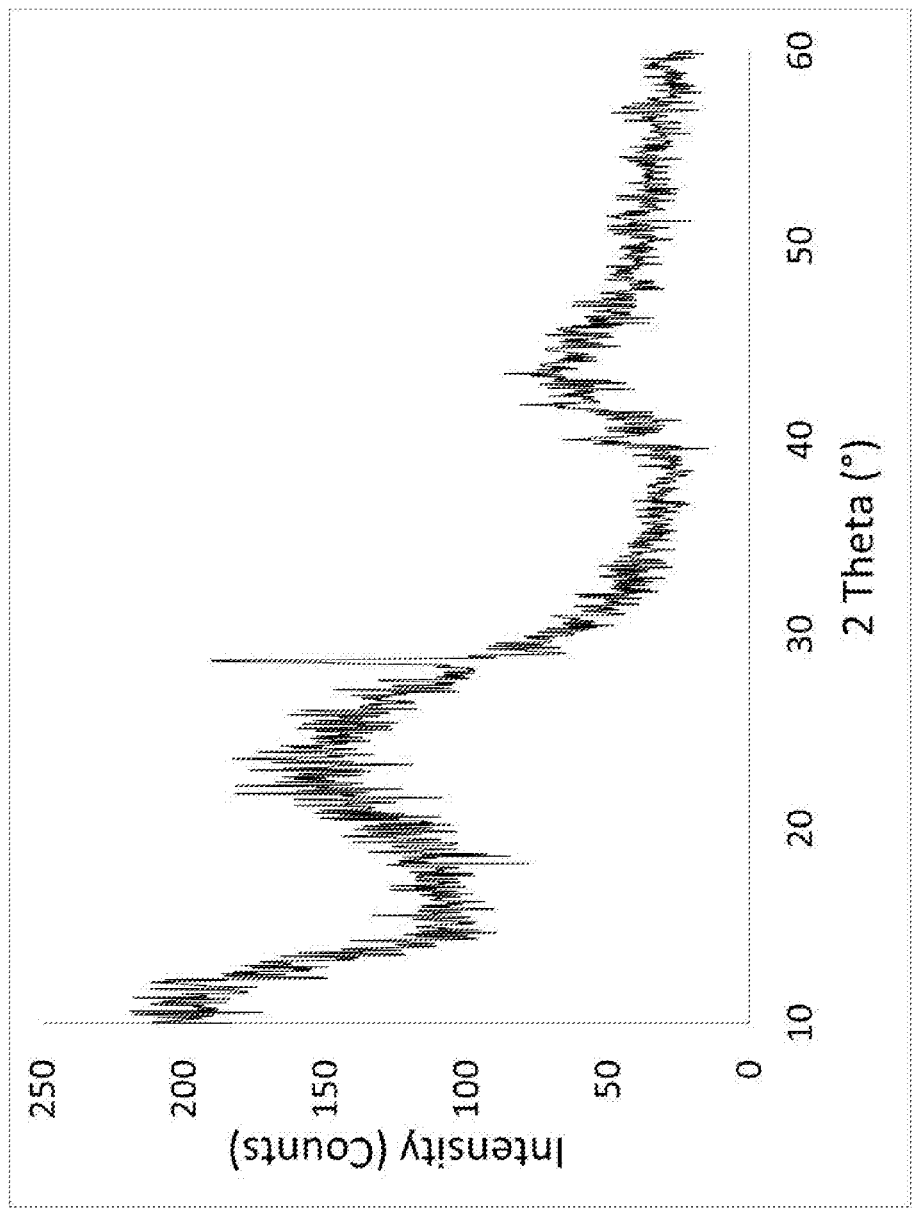
FIG. 6C shows the XRD results for the Sb/hard carbon composite containing 10 wt % Sb and 90 wt % hard carbon, made according to Example 6 with a secondary carbon-containing material.

FIG. 6C shows the XRD results for the target 10 wt % Sb+90 wt % Hard Carbon composite, made accoding to Example 6.

The invention claimed is:

1. A process for preparing an X/hard carbon composite material comprising the steps:
   a) forming a mixture comprising i) one or more hard carbon-containing starting materials, ii) one or more starting materials comprising one or more of the component elements of X, and optionally iii) one or more secondary carbon-containing materials; and
   b) heating the resulting mixture at 100° C. to 1500° C. to yield a hard carbon material and X particles that are dispersed on a surface of the hard carbon material and wherein at least a portion of X particles is dispersed within micro-size pores of the surface of the hard carbon material, thereby forming the X/hard carbon composite material;
   wherein X comprises one or more component elements selected from the group consisting of antimony, tin, phosphorus, sulfur, boron, aluminium, gallium, indium, germanium, lead, arsenic, bismuth, titanium, molybdenum, selenium, tellurium, and cobalt;

wherein X is present in the X/hard carbon composite in an amount of least 5% by weight of X based on a weight of X/hard carbon composite material;

wherein the mixture in step a) is either formed by:

mixing one or more hard carbon-containing starting materials, one or more starting materials comprising one or more of the component elements of X, optionally, one or more secondary carbon-containing materials, together in their solid form, and further optionally in the presence of a mixing liquid, or by dissolving the one or more starting materials comprising one or more of the component elements of X and mixing the resulting solution with a liquid dispersion of the one or more hard carbon-containing starting materials, and optionally the one or more secondary carbon-containing materials; and wherein step b) is performed substantially in the absence of a solvent or other liquid.

2. A process according to claim 1 wherein the average oxidation state of the one or more component elements of X in the X/hard carbon composite is lower than the average oxidation state of the one or more component elements of X in the one or more starting materials which comprise one or more of the component elements of X.

3. A process according to claim 1 wherein step (b) is conducted in a non-oxidising or inert atmosphere.

4. A process according to claim 1, wherein the one or more secondary carbon-containing materials are selected from one or more of: activated carbon materials, particulate carbon black materials, graphene, carbon nano-tubes, and graphite.

5. A process according to claim 4 wherein the one or more secondary carbon-containing materials are selected from one or more carbon materials with a BET nitrogen surface area of at least 5 m$^2$/g.

6. A process according to claim 1 wherein reaction proceeds via a carbothermal reduction reaction.

7. A process according to claim 1 wherein at least one of the one or more component elements of X in the X/hard carbon composite, is in a substantially zero oxidation state.

8. A process according to claim 1 wherein X, in the X/hard carbon composite, comprises one or more component elements of X in compound form with one or more elements selected from the group consisting of oxygen, carbon, nitrogen, phosphorus, sulfur, silicon, fluorine, chlorine, bromine and iodine.

9. A process according to claim 8 wherein X, in the X/hard carbon composite, comprises one or more component elements of X in two or more compound forms.

10. A process according to claim 1 wherein X, in the X/hard carbon composite, comprises an alloy of two or more component elements of X.

11. A process according to claim 1 wherein the X/hard carbon composite comprises X selected from one or more compounds selected from the group consisting of SnO, $SnO_2$, $Sb_2O_3$, and SbO.

12. A process according to claim 1 wherein the one or more hard carbon-containing starting materials are made via the pyrolysis of a carbohydrate-containing material.

13. A process according to claim 1 wherein the one or more hard carbon-containing starting material is milled to a particle size of from 1 to 20 µm prior to forming the mixture in step a) and/or the heating step (b).

14. A process according to claim 1 wherein the X/hard carbon composite further comprises one or more secondary carbon-containing materials.

15. A process according to claim 1 where a particle size of the one or more component elements of X in the X/hard carbon composite is 1 to 5 µm and/or the particle size of the hard carbon in the X/hard carbon composite is from 5 to 10 µm.

16. An X/hard carbon composite material comprising particles of X dispersed on a surface of a hard carbon core, and wherein at least a portion of the particles of X is dispersed within micro-size pores of the surface of the hard carbon core, wherein X comprises antimony, tin, phosphorus, sulfur, boron, aluminium, gallium, indium, germanium, lead, arsenic, bismuth, titanium, molybdenum, selenium, tellurium, cobalt or a combination thereof; wherein X is present in an amount of at least 5% by weight based on a weight of the X/hard carbon composite and wherein when X is Sn or SnSb alloy, the Sn or the SnSb alloy is dispersed solely within the micro-pores on the surface of the hard carbon core.

17. The X/hard carbon composite material according to claim 16 further comprising one or more secondary carbon-containing materials.

18. An energy storage device comprising the X/hard carbon composite material according to claim 16.

* * * * *